United States Patent
Ma et al.

(10) Patent No.: US 12,544,393 B2
(45) Date of Patent: Feb. 10, 2026

(54) APOPTOSIS-MIMICKING STRUCTURES FOR INDUCING TISSUE REGENERATION

(71) Applicant: THE REGENTS OF THE UNIVERSITY OF MICHIGAN, Ann Arbor, MI (US)

(72) Inventors: Peter X. Ma, Ann Arbor, MI (US); Laurie K. McCauley, Ann Arbor, MI (US); Ming Dang, Maple Grove, MN (US)

(73) Assignee: The Regents of the University of Michigan, Ann Arbor, MI (US)

( * ) Notice: Subject to any disclaimer, the term of this patent is extended or adjusted under 35 U.S.C. 154(b) by 796 days.

(21) Appl. No.: 16/637,219

(22) PCT Filed: Aug. 7, 2018

(86) PCT No.: PCT/US2018/045612
§ 371 (c)(1),
(2) Date: Feb. 6, 2020

(87) PCT Pub. No.: WO2019/032585
PCT Pub. Date: Feb. 14, 2019

(65) Prior Publication Data
US 2020/0230159 A1 Jul. 23, 2020

Related U.S. Application Data

(60) Provisional application No. 62/543,184, filed on Aug. 9, 2017.

(51) Int. Cl.
*A61K 31/685* (2006.01)
*A61K 9/16* (2006.01)
*A61K 33/06* (2006.01)
*A61K 45/06* (2006.01)
*A61K 47/54* (2017.01)
*A61K 47/64* (2017.01)

(52) U.S. Cl.
CPC .......... *A61K 31/685* (2013.01); *A61K 9/1676* (2013.01); *A61K 33/06* (2013.01); *A61K 45/06* (2013.01); *A61K 47/545* (2017.08); *A61K 47/64* (2017.08)

(58) Field of Classification Search
None
See application file for complete search history.

(56) References Cited

U.S. PATENT DOCUMENTS

| 6,132,764 | A | 10/2000 | Li et al. |
| 2006/0105031 | A1 | 5/2006 | Bolton et al. |
| 2008/0124386 | A1 | 5/2008 | Bolton et al. |
| 2016/0022835 | A1* | 1/2016 | Farokhzad ............ A61K 47/60 514/4.8 |

FOREIGN PATENT DOCUMENTS

| EP | 2177230 A1 | 4/2010 |
| WO | WO 2010/060104 | 5/2010 |
| WO | WO2013033513 | * 3/2013 |

OTHER PUBLICATIONS

Juin et al. (The Journal of Biological Chemistry, vol. 273, No. 28, Issue of Jul. 10, p. 17559-17564, 1998) Induction of a Caspase-3-like Activity by Calcium in Normal Cytosolic Extracts Triggers Nuclear Apoptosis in a Cell-free System.*
Jain et al. (J Control Release. Jan. 10, 2017; 245: 27-40) The Principles and Applications of Avidin-Based Nanoparticles in Drug Delivery and Diagnosis.*
Sah et al. (International Journal of Nanomedicine 8, 747-765 (Year: 2013) Concepts and practices used to develop functional PLGA-based nanoparticulate systems.*
Messersmith, P., et al. "Preparation of Calcium-Loaded Liposomes and Their Use in Calcium Phosphate Formation", *Chem. Mater.* 1998, 10, pp. 109-116.
International Search Report and Written Opinion for International Application No. PCT/US2018/045612 dated Oct. 17, 2018, 9 pages.

* cited by examiner

*Primary Examiner* — Tigabu Kassa
(74) *Attorney, Agent, or Firm* — Dierker & Kavanaugh, P.C.

(57) ABSTRACT

An apoptosis-mimicking structure includes a polymeric core. The polymeric core includes a polymer backbone. The polymer backbone includes or is modified with a functional group to directly or indirectly bond to an eat me signaling molecule. An eat me signaling molecule is bonded directly or indirectly to the functional group. Other structures include a scaffold and the apoptosis-mimicking structure immobilized on or incorporated into the scaffold.

25 Claims, 16 Drawing Sheets

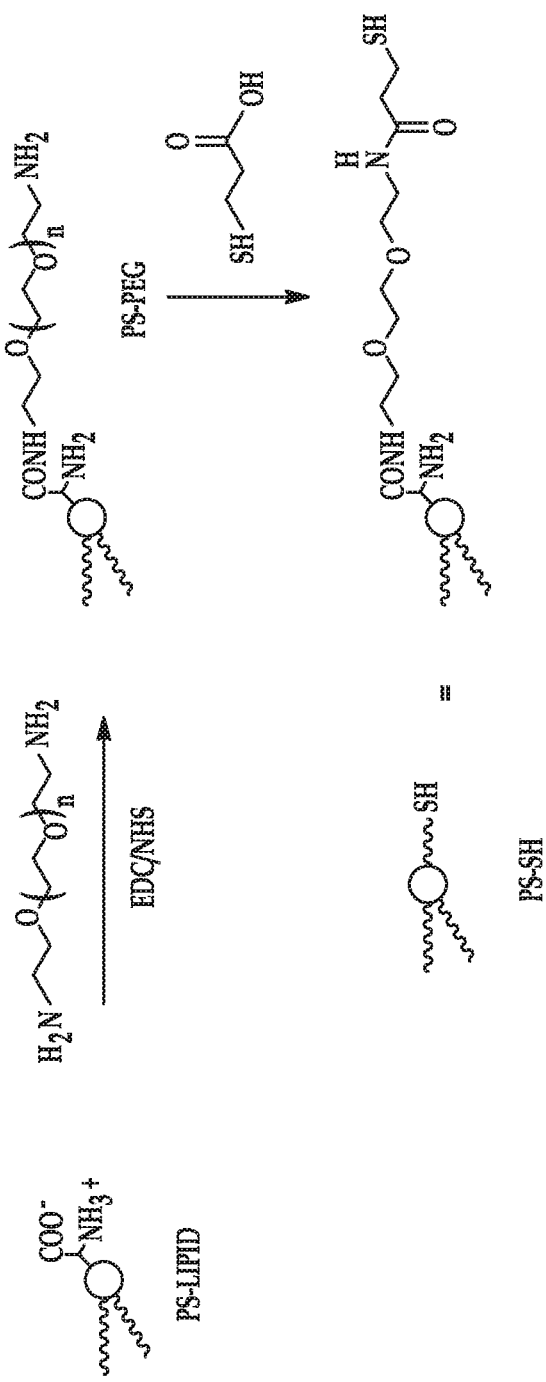
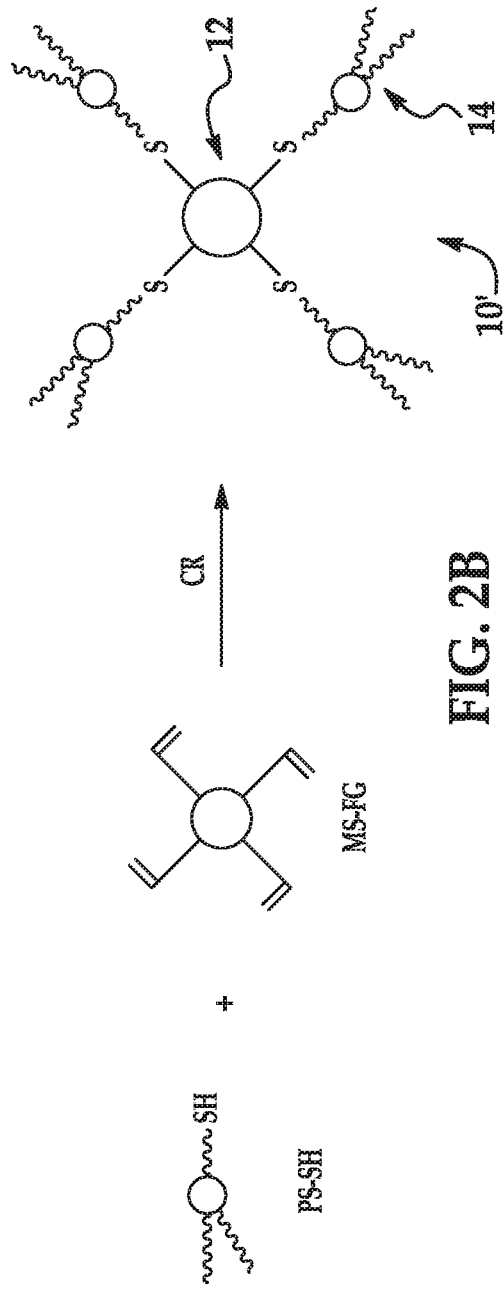
FIG. 2A
FIG. 2B

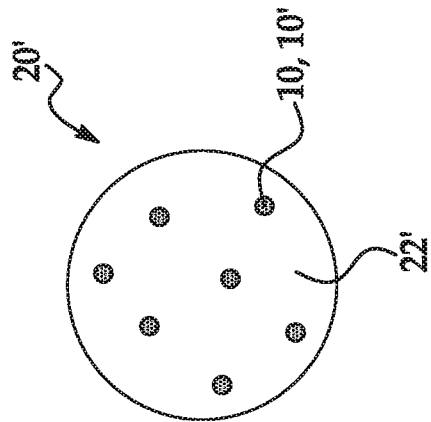
FIG. 3A
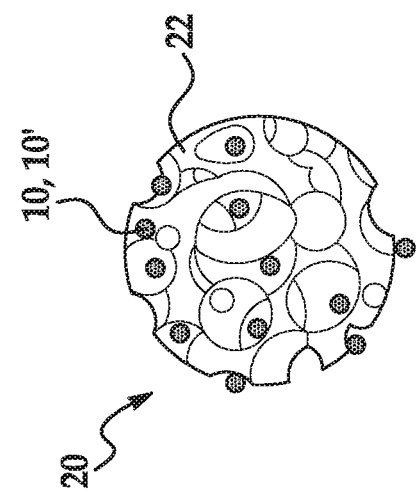
FIG. 3B
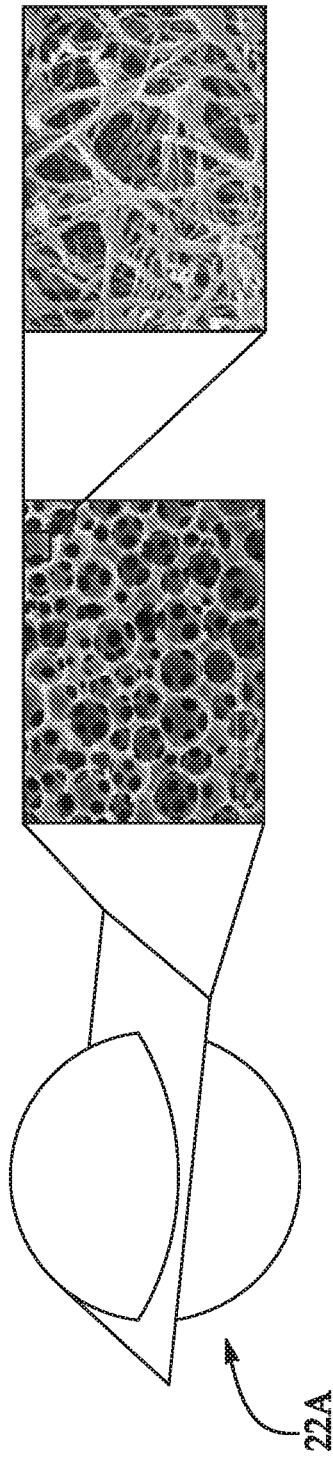
FIG. 4A
FIG. 4B
FIG. 4C

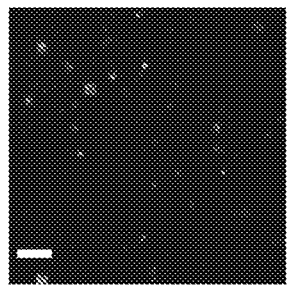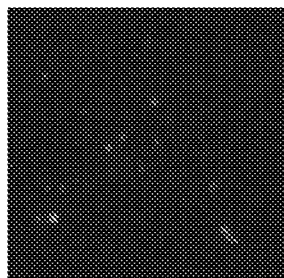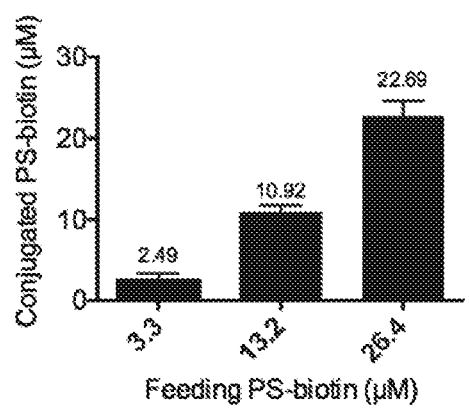
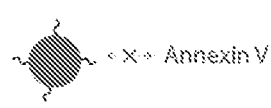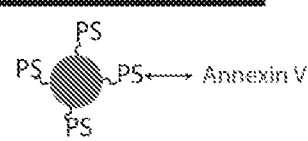
FIG. 12A   FIG. 12B   FIG. 12C
FIG. 13A   FIG. 13B   FIG. 13C
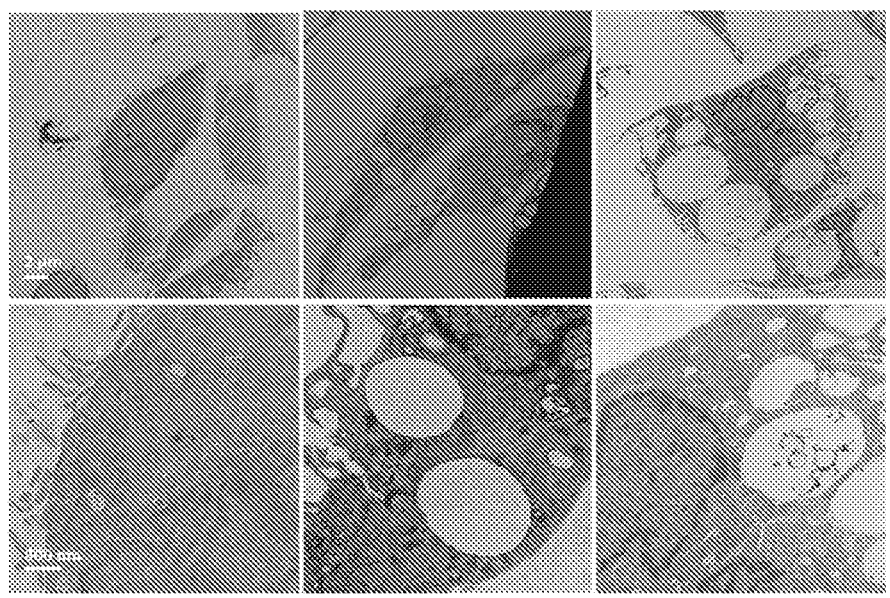
Low Magnification
High Magnification

US 12,544,393 B2

APOPTOSIS-MIMICKING STRUCTURES FOR INDUCING TISSUE REGENERATION

CROSS-REFERENCE TO RELATED APPLICATIONS

This application claims the benefit of U.S. provisional application Ser. No. 62/543,184, filed Aug. 9, 2017, the contents of which is incorporated by reference herein in its entirety.

STATEMENT REGARDING FEDERALLY SPONSORED RESEARCH OR DEVELOPMENT

This invention was made with government support under Grant Nos. DE015384, DE017689, DE022327 and DK053904 awarded by the National Institutes of Health (NIH) and under Grant No. W81XWH-12-2-0008 awarded by the US Army/MRMC. The government has certain rights in the invention.

BACKGROUND

Synthesized biomaterials have been shown to be useful for engineering tissue regeneration and repair, at least in part because they recapitulate the physical characteristics of the biological tissue environment. For example, synthetic biomaterials have been generated with physical architecture that mimics the extracellular matrix (ECM). These biomaterials have been used as drug carriers and/or tissue engineering scaffolds. Many of the scaffolding materials are capable of promoting osteoblast differentiation and biomineralization, which, in turn, induce bone regeneration. However, cells generally need to be incorporated into or onto the scaffolding material in order to repair critical-sized bone defects (i.e., defects that will not heal without intervention).

SUMMARY

In one aspect disclosed herein, an apoptosis-mimicking structure, comprises: a polymeric core including a polymer backbone that includes or is modified with a functional group to directly or indirectly bond to an eat me signaling molecule; and an eat me signaling molecule bonded directly or indirectly to the functional group.

In another aspect disclosed herein, a method for making an apoptosis-mimicking structure comprises: generating a microsphere from a polymer backbone that includes or is modified with a functional group to directly or indirectly bond to an eat me signaling molecule; and bonding an eat me signaling molecule directly or indirectly to the functional group.

In still another aspect disclosed herein, a structure, comprises a scaffold; and an apoptosis-mimicking structure immobilized on or incorporated into the scaffold, the apoptosis-mimicking structure including: a polymeric core including a polymer backbone that includes or is modified with a functional group to directly or indirectly bond to an eat me signaling molecule; and an eat me signaling molecule bonded directly or indirectly to the functional group.

It is to be understood that any features of the apoptosis-mimicking structure and/or the method and/or the structure disclosed herein may be combined together in any desirable manner. Moreover, it is to be understood that any combination of features of the apoptosis-mimicking structure and/or the method and/or the structure disclosed herein may be used together, and/or combined with any of the examples disclosed herein.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 2A and 2B together schematically illustrate another example of a method for making an example of an apoptosis mimicking structure;

FIGS. 3A and 3B are schematic illustrations of structures including different scaffolds and an apoptosis mimicking structure incorporated on or in the scaffold;

FIGS. 4A through 4C respectively depict a schematic, perspective view of a nanofibrous scaffold, a cross-sectional view taken along the plane shown in FIG. 4A, and an enlarged view of nanofibers and spaces making up the nanofibrous scaffold;

FIGS. 12A and 12B depict confocal images and corresponding schematic images of FITC-tagged control $NH_2$-PEG-$NH_2$ modified microspheres and apoptosis mimicking structures after incubation with Annexin V (a red fluorescence phosphatidylserine binding protein) (scale bar=10 μm);

FIG. 12C is a graph depicting the amount of biotin modified eat me signaling molecules (X-axis, µM) conjugated on the surface of the apoptosis mimicking structures at different feeding amounts (Y axis, µM);

FIGS. 13A through 13C are transmission electron micrograph (TEM) images of macrophages (A) and engulfment of control $NH_2$-PEG-$NH_2$ modified microspheres (B) and apoptosis mimicking structures (C) at low magnification (upper row) and high magnification (lower row);

DETAILED DESCRIPTION

Disclosed herein are apoptosis-mimicking structures. The structures mimic apoptotic cells because they are surface conjugated with apoptotic-cell surface signals (i.e., "eat me" signaling molecules). As used herein, the term "eat me signaling molecule" refers to any apoptotic-cell surface signaling molecule or any other molecule that induces macrophages to perform phagocytosis or efferocytosis. The eat me signaling molecules are bonded directly or indirectly to a polymer backbone making up a core of the structure.

When present in a tissue defect, the eat me signaling molecules of the apoptosis-mimicking structures target macrophages. The macrophages recognize the signaling molecules, and engulf the particles that have the eat me signaling molecules (this process is known as phagocytosis or efferocytosis). During or after efferocytosis, the macrophages may secrete various biological molecules, and some of them may attract endogenous stem/progenitor cells to the site of the efferocytosis, thus initiating localized tissue regeneration. When such apoptosis-mimicking particles are distributed in a three-dimensional (3D) space, such as in a tissue-engineering scaffold (e.g., porous materials, hydrogels, or micro cell carriers), the efferocytosis can lead to scaffold-defined 3D tissue regeneration from the recruited endogenous tissue stem/progenitor cells. When the 3D scaffold with the apoptosis-mimicking particles is implanted or injected into a specific tissue, the subsequent efferocytosis process will lead to the specific tissue regeneration within the 3D scaffold.

In an example, if a scaffold with the apoptosis-mimicking particles is implanted in a bone defect, through efferocytosis and biomolecule release, the macrophages can secrete chemokines (e.g., C-C motif chemokine ligand 2 (CCL-2), aka monocyte chemotactic protein 1 (MCP 1)) to recruit endogenous mesenchymal stem/progenitor cells and growth factors to facilitate their differentiation and/or enhance their osteoblastic function, resulting in bone regeneration in the scaffold-defined 3D space.

With the examples disclosed herein, the bone regeneration occurs without having to seed cells onto the scaffold. As such, unintended outcomes due to a number of different factors, such as cell origin, ability to isolate and/or expand the cell, potential for cell change during manipulation outside the body, etc., are avoided. Moreover, without having to account for these factors (and potentially others) associated with cells, the synthesis of scaffolds incorporating the apoptosis-mimicking structures 10, 10' may be simplified.

Figure 1A:
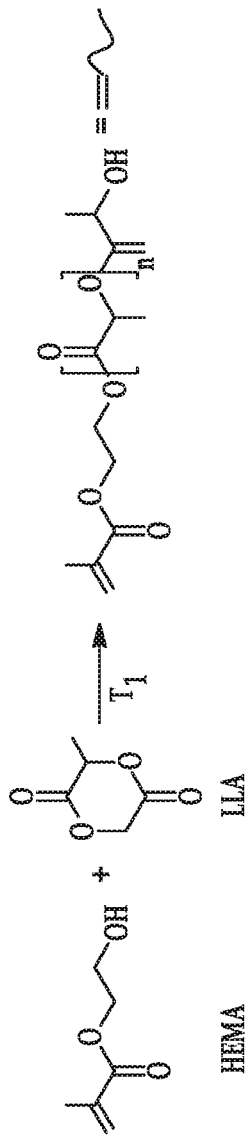
FIGS. 1A through 1E together schematically illustrate an example of a method for making an example of an apoptosis mimicking structure.
Figure 1B:
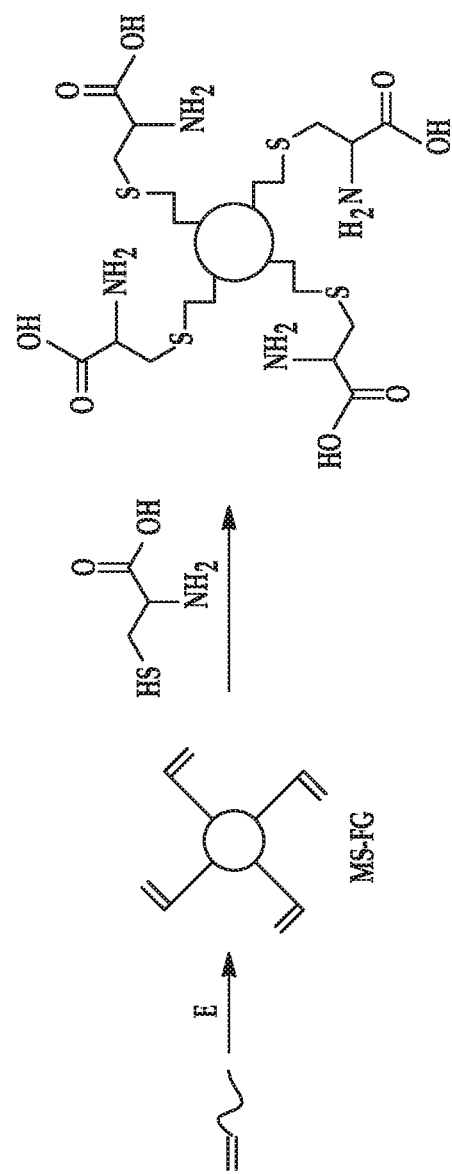
Figure 1C:
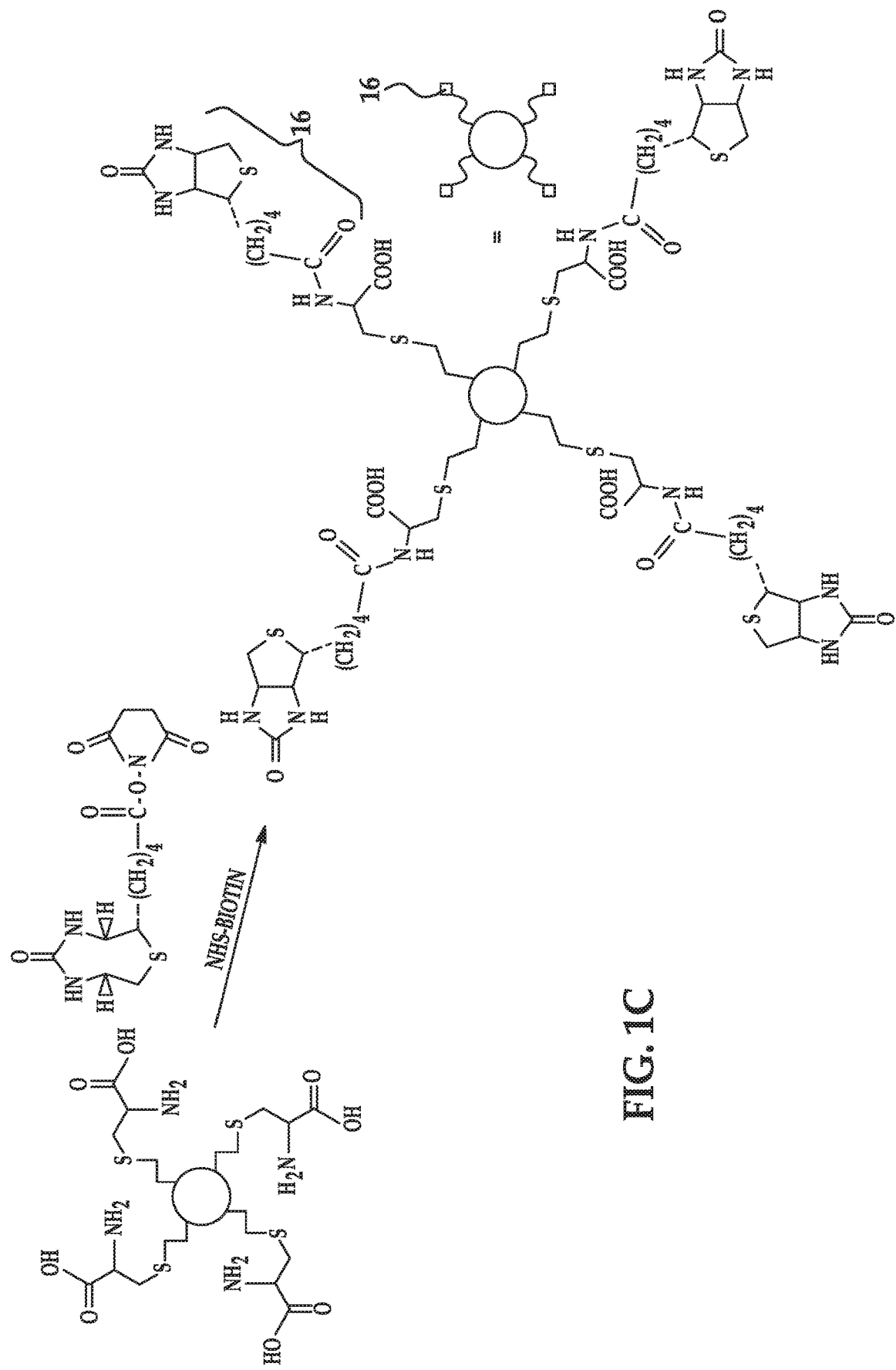
Figure 1D:
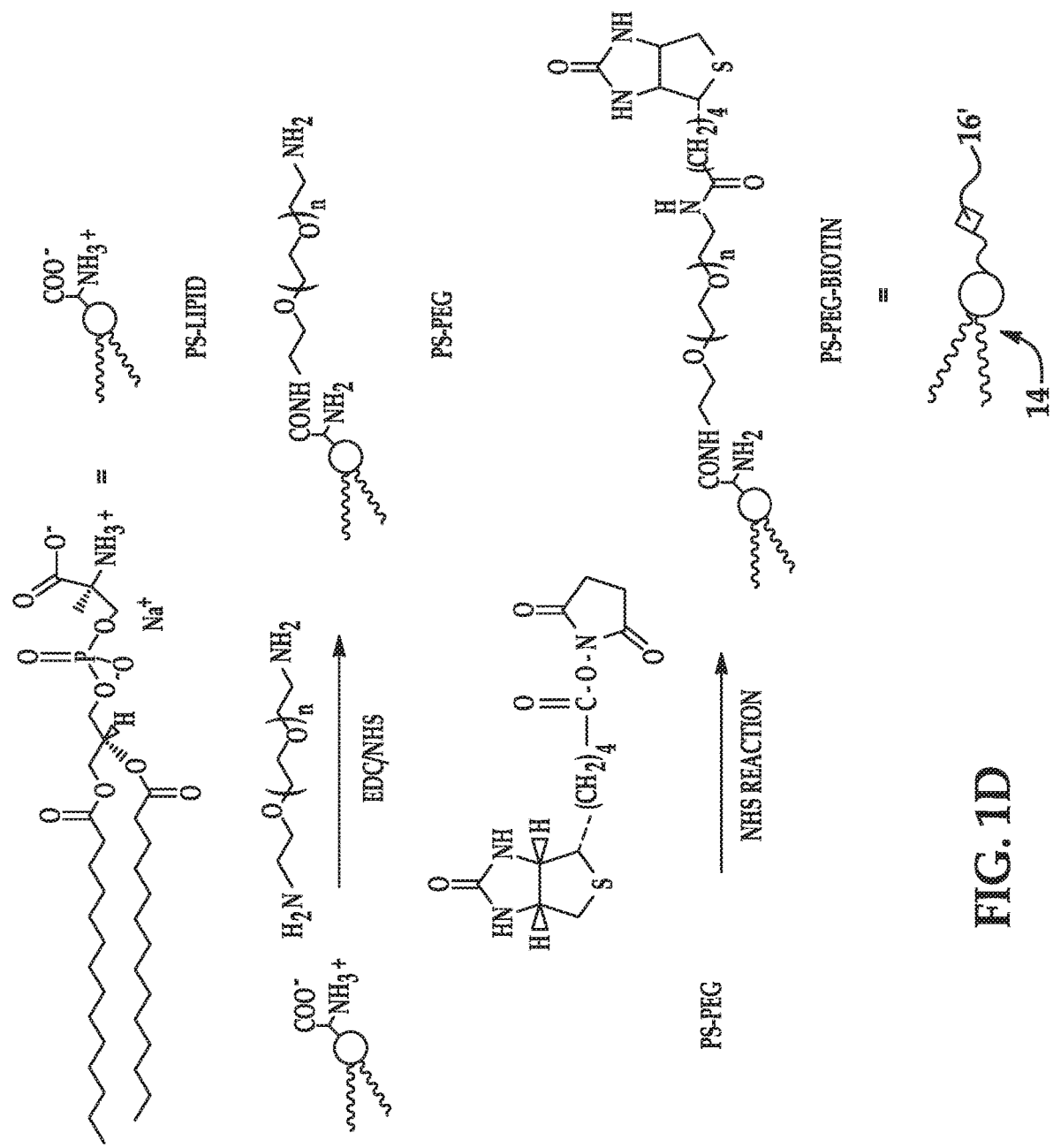
Figure 1E:
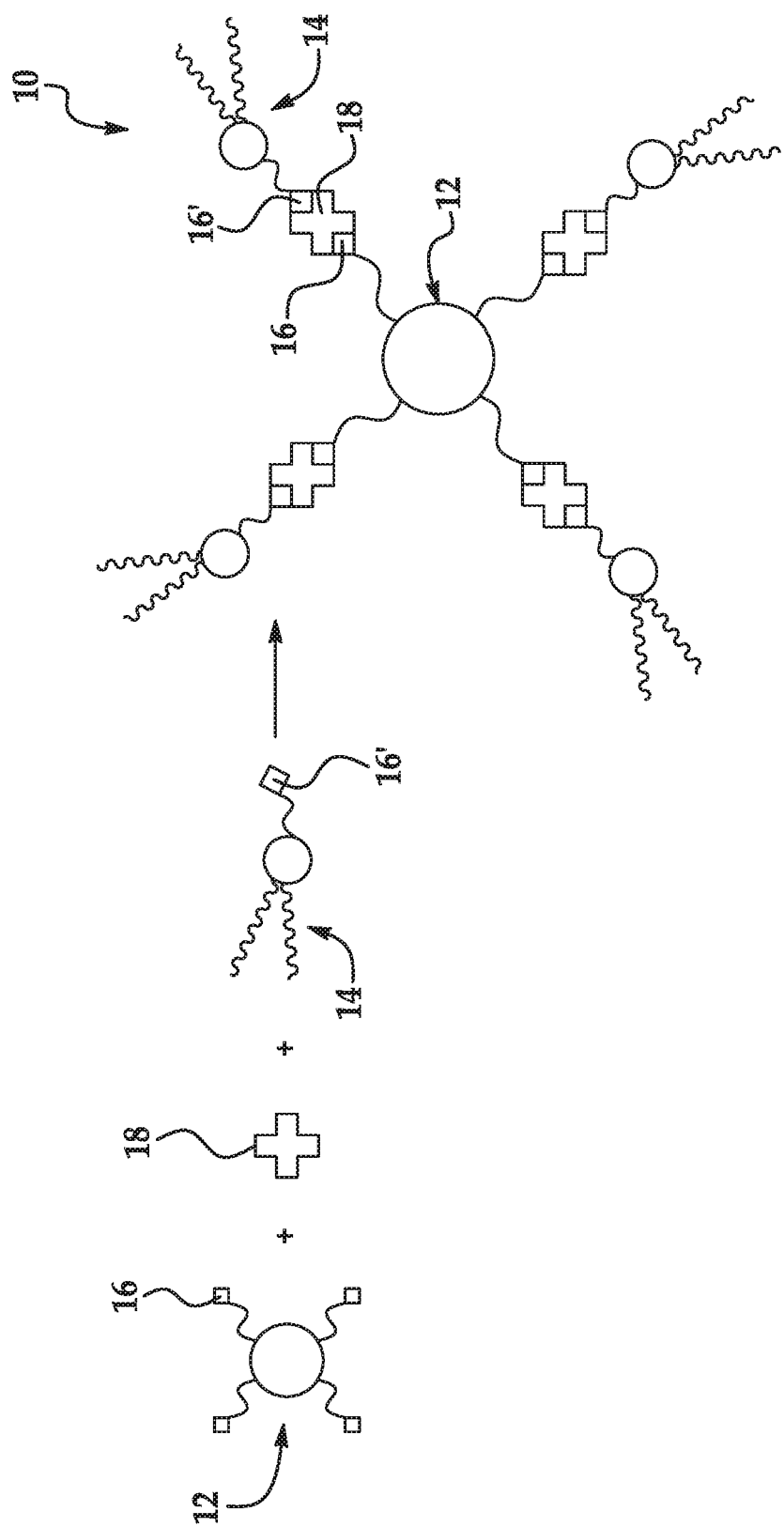

Examples of the apoptosis-mimicking structures 10, 10' are shown in FIGS. 1E and 2B. Each of these structures 10, 10' includes: i) a polymeric core 12 including a polymer backbone that includes or is modified with a functional group to directly or indirectly bond to an eat me signaling molecule; and ii) an eat me signaling molecule 14 bonded directly or indirectly to the functional group. The polymeric core 12 and the eat me signaling molecule 14 of the structures 10, 10' are generally and respectively labeled 12, 14; however, it is to be understood that the polymeric cores 12 and the eat me signaling molecules 14 of the structures 10, 10' may have different surface functional groups attached thereto. Furthermore, the apoptosis-mimicking structure 10 shown in FIG. 1E illustrates an example of an indirect linkage of the polymeric core 12 to the eat me signaling molecules 14 through additional linking groups 16, 16' and a binding protein 18; while the apoptosis-mimicking structure 10' shown in FIG. 2B illustrates an example of a direct linkage of the polymeric core 12 to the eat me signaling molecules 14 through their respective surface groups.

The apoptosis-mimicking structures 10, 10' disclosed herein may be a solid (and non-porous) sphere, a porous sphere, or a hydrogel. The hydrogel is hydrophilic. Some examples of the solid and/or porous spheres may also be hydrophilic. The surface of the apoptosis-mimicking structures 10, 10' may be smooth, porous, fibrous, patterned, etc.

It is to be understood that the term "sphere" is used generally to describe the geometry of the apoptosis-mimicking structures 10, 10', and may encompass both spherical and non-spherical shapes, such as ellipoids, spheroids, or other non-regular three-dimensional shapes.

The polymer(s) making up the core 12 of the apoptosis-mimicking structure 10, 10' may be biodegradable, so that they are useable in biological systems. In an example, the apoptosis-mimicking structure 10, 10' is a solid or porous sphere, and the polymer backbone is a synthetic polymer selected from the group consisting of poly(l-lactide) (i.e., poly(l-lactic acid)), poly(lactide-co-glycolide), polyglycolide (i.e., polyglycolic acid), polyanhydrides, poly(ortho esters), polycaprolactone, poly(hydroxy butyrate), poly (phosphoesters), poly(glycerol sebacate), poly(propylene fumarate), polyphosphazenes, polycarbonates, polyurethane, copolymers thereof, and combinations thereof, or is a natural macromolecule selected from the group consisting of collagen, gelatin, elastin, silk proteins, and combinations thereof. In another example, the apoptosis-mimicking structure 10, 10' is hydrophilic and/or a hydrogel; and the polymer backbone is selected from the group consisting of poly(ethylene glycol), poly(vinyl alcohol), poly(2-hydroxyethyl methacrylate), polyvinylpyrrolidone, polyvinyl alcohol, alginate, collagen, gelatin, hyaluronic acid, starch, glycogen, cellulose, carrageenan, dextran, chitin, chitosan, pectin, heparin, heparan sulfate, poly(acrylic acid), poly (acrylamide), poly(N,N'-methylenebisacrylamide), copolymers thereof, and combinations thereof. Combinations of the polymers include blends of two or of the listed polymers. For example, the polymer core 12 may include a blend of two or more of the listed polymers, such as poly(lactide-co-glycolide) and poly(l-lactide) modified with 2-(hydroxyethyl) methacrylate (HEMA).

The polymer backbone includes or is modified with a functional group that is capable of directly or indirectly bonding to the eat me signaling molecule 14. As examples, the functional group is selected from the group consisting of a hydroxyl, an amine, a thiol, a carboxylic acid, an alkene, an alkyne, an alkyl halide, an aldehyde, a ketone, an ester, an amide, and a phenyl.

Similarly, the eat me signaling molecule 14 may include or be modified with a functional group that bonds to the functional group of the polymer backbone. In an example, the eat me signaling molecule 14 is modified with a functional group that bonds to the functional group of the polymer backbone, and the eat me signaling molecule functional group is selected from the group consisting of a hydroxyl, an amine, a thiol, a carboxylic acid, an alkene, an alkyne, an alkyl halide, an aldehyde, a ketone, an ester, an amide, and a phenyl. Some specific examples of the eat me signaling molecules 14 are selected from the group consisting of phosphatidylserine, oxidized phosphatidylserine, lysophosphatidylcholine, sphingosine-1-phosphate, annexin I, annexin I antibodies, intercellular adhesion molecule 3, modified CD31, an opsonin, a chemokine, a nucleotide, and combinations thereof.

The polymer backbone functional group may be directly or indirectly bonded to the eat me signaling molecule 14. In the examples disclosed herein, the bond is a chemical bond, which is formed, for example, via conjugation chemistry. Examples of the conjugation chemistry include avidin-biotin linking, click chemistry, ionic interaction, hydrogen bonding, coordinate bonding, and host-guest interaction.

An example of effective ionic interaction is the interaction between a polycation (such as poly(sodium styrene sulfonate) (PSS), salmon sperm protamine sulfate, poly-L-lysine, poly-L-arginine, polybrene, etc.) and a polyanion (such as polyacrylic acid (PAA), commercial porcine heparin, chondroitin sulfate A, chondroitin sulfate B (dermatan sulfate), chondroitin sulfate C and heparan sulfate). A few examples of strong hydrogen bonding include 2-ureido-4 [1H]-pyrimidinone (UPy) hydrogen-bonding, cytosine-guanine hydrogen-bonding, adenine-thymine hydrogen-bonding, etc. A few examples of coordinate bonding include a ferric ion-dopamine complex, an ethylenediaminetetraacetic acid-ion complex, etc. A few examples of host-guest interaction include the interaction between cyclodextrin, cucurbituril, calixarene and guest molecules inside their cavities, as well as ion-crown ether complexes.

An example of a method for making the apoptosis-mimicking structure 10, 10' includes: generating a microsphere (MS-FG, shown in FIGS. 1B and 2B) from a polymer backbone that includes or is modified with a functional group to directly or indirectly bond to an eat me signaling molecule; and bonding an eat me signaling molecule 14 directly or indirectly to the functional group. In some examples, the eat me signaling molecule 14 is bonded to the polymer backbone functional group before the microsphere MS-FG is fabricated. In this example, the eat me signaling molecule is conjugated to the functional group of the polymer backbone, and then the microsphere is generated. In other examples, the microsphere MS-FG is fabricated, and then the eat me signaling molecule 14 is bonded to the polymer backbone functional group.

FIGS. 1A through 1E illustrate an example of the method where the microsphere MS-FG is first fabricated from a polymer backbone modified with alkene groups, and then the eat me signaling molecule 14 is indirectly bonded to the polymer backbone alkene groups. In this example, the indirect bonding is accomplished through linking groups 16, 16' and a binding protein 18. More specifically, a first linking group 16 is bonded to the functional group (of the polymer backbone); a binding protein 18 is bonded to the first linking group 16; and a second linking group 16' is bonded to the binding protein 18 and to the eat me signaling molecule 14. In the example shown, each of the first linking group 16 and the second linking group 16' is biotin and the binding protein 18 is avidin, and as such, the apoptosis mimicking structure 10 is bonded through avidin-biotin interaction.

As shown in FIG. 1A, prior to generating (or fabricating) the microsphere MS-FG, the method involves attaching the functional group to the polymer backbone. In these examples, the microsphere MS-FG may then be fabricated/generated, as shown in FIG. 1B. As will be described in more detail below, in some examples, the attaching of the functional group to the polymer backbone involves a ring opening polymerization of monomers or dimers using a catalyst and an initiator with the functional group; and the generating of the microsphere MS-FG involves an emulsion technique or a double emulsion technique.

In FIG. 1A, 2-(hydroxyethyl) methacrylate (HEMA) initiates the polymerization of L-lactide (LLA). This reaction (which takes place at a predetermined temperature $T_1$) introduces alkene functional groups (from HEMA) to the poly(lactide) polymer backbone. In this reaction, HEMA is used as an initiator and $Sn(Oct)_2$ may be used as a catalyst for the ring-opening polymerization of the L-lactide. In FIG. 1A, "n" is the number of repeating units (i.e., the degree of polymerization), and in an example, n ranges from about 500 to about 10,000,000.

In this example, the HEMA-PLLA polymer is then formulated into microspheres using an emulsion (E) technique. This is shown schematically in FIG. 1B. The emulsion technique may involve forming a solution of the HEMA-PLLA polymer in a non-aqueous solvent, and then emulsifying the solution in an aqueous solution to create an oil-in-water emulsion. The emulsion may be stirred for a predetermined time period in order to evaporate the non-aqueous solvent and form HEMA-PLLA polymer microspheres with surface alkene groups (MS-FG, center structure in FIG. 1B).

Since avidin-biotin linking/interaction is used in this example of the method, prior to bonding the eat me signaling molecule 14, this example of the method further includes forming a biotin-modified microsphere (the product shown in FIG. 1C). The biotin-modified microsphere may be formed by bonding cysteine to surface groups of the microsphere (center structure in FIG. 1B); and bonding biotin to the cysteine groups. The thiol groups of cysteine are capable of undergoing a click reaction with the surface alkene groups of the HEMA-LLA copolymer microspheres MS-FG. The product of this click reaction (MS-cys) includes amine groups attached to carboxyl end groups, as shown in FIG. 1B. In FIG. 1C, N-hydroxysuccinimidobiotin (NHS-biotin) is reacted with an aqueous dispersion including the product of FIG. 1B. This reaction converts the amine groups into biotin (an example of the first linking group 16), and thus forms the biotin-modified microsphere shown in FIG. 1C.

FIG. 1D illustrates the introduction of biotin (an example of the second linking group 16') to the eat me signaling molecule 14. In this example, the eat me signaling molecule 14 is phosphatidylserine (PS lipid), as shown at the top of FIG. 1D. In one example, the biotin-modified eat me signaling molecule may be formed by bonding amine-modified poly(ethylene glycol) to the eat me signaling molecule 14 (to form PS-PEG), and binding biotin to the amine-modified poly(ethylene glycol) (to form PS-PEG-biotin).

Prior to the introduction of the biotin, the eat me signaling molecule 14 may first be modified with an amine group, or another functional group capable of reacting with biotin. The amine group may be an end group of an amine-modified polyethylene glycol, such as amino functionalized polyethylene glycol ($NH_2$-PEG-$NH_2$). In order to link the amine-modified polyethylene glycol to the carboxylic acid of phosphatidylserine, a carbodiimide compound (such as 1-ethyl-3-(3-dimethylaminopropyl)carbodiimide (EDC)) may be included. Moreover, N-hydroxysuccinimide (NETS) or its water-soluble analog (Sulfo-NHS) may be included with the EDC coupling protocol to improve efficiency or create dry-stable (amine-reactive) intermediates. EDC couples NETS to carboxyls, and allows for efficient conjugation to primary amines at physiologic pH.

Moreover, the polyethylene glycol chain is hydrophilic and serves as a flexible spacer to make the eat me signaling molecule more accessible to macrophages.

The eat me signaling molecule modified with the amine functional group may then be reacted with biotin including an NETS group. The NETS group reacts with the amine functional group attached to the eat me signaling molecule to yield a stable amide bond between the biotin and the eat me signaling molecule (shown in FIG. 1D) and to release NETS (not shown in FIG. 1D).

As shown schematically in FIG. 1E, the biotin-modified microsphere of FIG. 1C and the biotin-modified eat me signaling molecule of FIG. 1D are bonded together via avidin (an example of the binding protein 18). In an example, the bonding of the eat me signaling molecule indirectly to the functional group (of the polymeric core 12 of the biotin-modified microsphere) includes dispersing the biotin-modified microsphere in water to form a dispersion; adding avidin to the dispersion; and adding the biotin-modified eat me signaling molecule to the dispersion. In an example, from about 0.01 mg to about 100 mg of avidin is added for every 10 μg of biotin (of the biotin-modified eat me signaling molecule). In this example, the biotin-avidin-biotin interaction bonds the polymeric core 12 to the eat me signaling molecule 14 so that the eat me signaling molecules 14 are present at the surface of the polymeric core 12.

It is to be understood that the method described in reference to FIGS. 1A through 1E may be used with any other polymer backbone as long as the backbone includes or is modified with a functional group to allow biotin attachment. For example, the same process can be used to synthesize a HEMA containing PLGA polymer, to fabricate the HEMA-PLGA polymer into HEMA-PLGA microspheres, to attach biotin to the HEMA-PLGA microspheres, to then attach avidin, and to then attach the biotin that is linked to eat me signaling molecule.

FIGS. 2A and 2B illustrate another example of the method where the microsphere is first fabricated from a polymer backbone modified with alkene groups, and then the eat me signaling molecule 14 is directly bonded (via a click reaction) to the polymer backbone alkene groups. Prior to bonding the eat me signaling molecule 14, this example of the method may involve introducing a thiol functional group to the eat me signaling molecule 14, and the bonding of the eat me signaling molecule 14 may involve a click reaction between the thiol functional group and the functional group (of the polymer backbone).

FIG. 2A depicts the introduction of the thiol functional group to the eat me signaling molecule 14. In this example, the eat me signaling molecule 14 is phosphatidylserine (PS lipid, the structure of which is shown at the top of FIG. 1D). In this example, the eat me signaling molecule 14 may first react with an amine group. The amine group may be an end group of an amine-modified polyethylene glycol, such as amino functionalized polyethylene glycol ($NH_2$-PEG-$NH_2$). In order to link the amine-modified polyethylene glycol to the carboxylic acid of phosphatidylserine, EDC, alone or in combination with NHS, may be included.

The eat me signaling molecule 14 modified with the amine functional group may then be reacted with 3-mercaptopropionic acid, or another suitable thiol containing compound in order to introduce the thiol functional group to the eat me signaling molecule 14. This reaction may also take place in the presence of EDC and NHS to yield a stable amide bond between the 3-mercaptopropionic acid and the eat me signaling molecule 14 (PS-SH).

As shown in FIG. 2B, the eat me signaling molecule 14 (PS-SH) is reacted with microspheres having surface alkene groups or other suitable functional groups. In one example, the microspheres having surface alkene groups may be HEMA-PLLA polymer microspheres with surface alkene groups, which may be formed as described in reference to FIGS. 1A and 1B. It is to be understood that other functional group modified polymer backbones may be used to form the microspheres that are used in this example of the method. For example, the microspheres may be hydrogel particles made from, for example, one or more polymers and/or monomers, including polyethylene glycol diacrylate, alginate, acrylic acid, acrylamide, methylene bisacrylamide, etc. As one example, the hydrogel microsphere is formed from polyethylene glycol diacrylate and methylene bisacrylamide using emulsion polymerization. In this one example, the hydrogel microsphere includes alkene surface groups.

In the example shown in FIG. 2B, the eat me signaling molecule 14 (PS-SH) and the microspheres having surface alkene groups and a catalyst (such as tris(2-carboxyethyl) phosphine (TCEP) may be dispersed in water, purged with nitrogen gas ($N_2$), and stirred for a predetermined time period at room temperature (i.e., about 18° C. to about 22° C.). Click reaction(s) is/are induced between the thiol groups of the eat me signaling molecule 14 (PS-SH) and the surface alkene groups of the microspheres to form the apoptosis-mimicking structure 10' (MS—S-PS) shown in FIG. 2B.

Some examples of the apoptosis-mimicking structure 10, 10' disclosed herein include a mineral, a biomolecule, or combinations thereof at least partially encapsulated within the polymeric core 12. Examples of biomolecules may include a protein, a peptide, a hormone, a nucleic acid, etc. In an example, the mineral is a calcium-containing compound; or the biomolecule is selected from the group consisting of chemokine ligand 2, chemokine ligand 7, interleukin 4, interleukin 13, transforming growth factor-beta (TGF-β), fibroblast growth factor (FGF), VEGF, platelet derived growth factor (PDGF), parathyroid hormone (PTH), chemoattractant, bone morphogenetic protein (BMP), derivatives thereof, and combinations thereof. Examples of calcium-containing compounds include hydroxyapatite, calcium chloride, calcium sulfate, calcium phosphate, calcium carbonate, etc. Another suitable mineral may be a silicon-containing compound. In still other examples, the polymer core 12 may at least partially encapsulate nucleic acids (e.g., DNA, pDNA, RNA, mRNA, miRNA, siRNA, etc.), steroids (e.g., dexamethasone), anti-microbials, and other small molecules and/or additives, such as, ascorbic acid, β-glycerol phosphate, etc.

The mineral and/or biomolecule and/or other component may be at least partially encapsulated within the polymeric core 12 during the formation of the functionalized microsphere MS-FG. As such, some examples of the method disclosed herein involve loading a mineral, a biomolecule, or combinations thereof into the microsphere during the generation of the microsphere. As an example of this loading process, the mineral and/or the biomolecule may be incorporated into an aqueous solution, which is emulsified into a non-aqueous solution of the polymer modified with the functional group. This water-in-oil emulsion may then be added to an aqueous solution (e.g., 1% w/v of PVA) to create a water-in-oil-in-water double emulsion. The double emulsion may be stirred to evaporate the non-aqueous solvent and centrifuged to collect the formed microspheres. These microspheres include the polymer core 12, which at least partially encapsulates the mineral and/or the biomolecule.

Some examples of the apoptosis-mimicking structure 10, 10' may also include additional functional molecules at the surface of the polymer core 12 (i.e., in addition to the eat me signaling molecule 14). These additional functional molecules may include, for example, molecules that improve the adhesion of the structure 10, 10' (e.g., to a scaffold), the adhesion of cells, such as macrophages, to the structure 10, 10' (e.g., into a scaffold), the hydrophilicity or hydrophobicity of the structure 10, 10', or other adhesion or repelling properties.

The apoptosis-mimicking structure 10, 10' may have an average diameter ranging from about 0.1 µm to about 100 µm. In some examples, apoptosis-mimicking structure 10, 10' may have an average diameter ranging from about 0.5 µm (500 nm) to about 50 µm.

The examples of the apoptosis-mimicking structure 10, 10' disclosed herein may be immobilized on or incorporated into a scaffold to form a structure that is injectable or implantable. Examples of these structures 20, 20' are shown in FIGS. 3A and 3B. Each structure 20, 20' includes the scaffold 22, 22', and the apoptosis-mimicking structure 10, 10' immobilized on (FIG. 3A) or incorporated into (FIG. 3B) the scaffold 20, 20'. As previously described herein, the apoptosis-mimicking structure 10, 10' includes: i) the polymeric core 12 including the polymer backbone that includes or is modified with the functional group to directly or indirectly bond to the eat me signaling molecule 14; and ii) the eat me signaling molecule 14 bonded directly or indirectly to the functional group.

The apoptosis-mimicking structure 10, 10' disclosed herein may be immobilized on the scaffold 22 using annealing or solvent treatment methods. Either temperature or a non-solvent of the scaffold 22 or non-solvent/solvent mixture may be used to swell or soften (but not dissolve or melt) the polymer of the scaffold 22, which renders the scaffold 22 sticky so that the apoptosis-mimicking structure 10, 10' are physically attached to the scaffold 22. In an example of the solvent treatment method, the apoptosis-mimicking structure 10, 10' is mixed with the scaffold 22 in a predetermined ratio to form a powder mixture. The powder mixture is subjected to a non-solvent or a non-solvent/solvent mixture for a predetermined time, followed by vacuum drying to remove the non-solvent or non-solvent/solvent mixture. This process immobilizes the apoptosis-mimicking structure 10, 10' on exposed surface(s) of the scaffold 22.

The apoptosis-mimicking structure 10, 10' disclosed herein may be incorporated into a scaffold 22' by building the scaffold 22' around the apoptosis-mimicking structure 10, 10'. In an example, the already formed apoptosis-mimicking structure 10, 10' may be dispersed in an aqueous polymer or monomer solution during the formation of the scaffold 22'.

While the larger scale shape of each of the scaffolds 22, 22' is shown as a sphere/spherical, it is to be understood that the larger scale shape of the scaffold 22, 22' may have other forms. As examples, the scaffold 22, 22' may be a sheet (e.g., square or rectangular) or a disk (e.g., circular, oval), or it may be spheroidal, tubular, cylindrical, cubic, or have some other shape, including more complex shapes, such as, for example, an organ (e.g., ear, jaw, finger, vessel, heart, etc.).

The scaffold 22 may be any structure formed of a biodegradable material that can carry the apoptosis-mimicking structure 10, 10' on one or more of its exposed surface(s). The scaffold 22' may be any structure formed of a biodegradable material that can carry the apoptosis-mimicking structure 10, 10' within the interior of the structure. In the examples disclosed herein, the scaffold is selected from the group consisting of a polymer scaffold with a porous structure, a polymer scaffold including nanofibrous walls and interconnected pores, an injectable hydrogel scaffold, an implantable hydrogel scaffold, and an injectable cell microcarrier. Examples of the scaffold 22 include the polymer scaffold including nanofibrous walls and interconnected pores (shown in FIGS. 4A-4C) and the injectable cell microcarriers. Some specific examples of the injectable cell microcarriers include nanofibrous hollow microspheres (shown in FIGS. 5A-5C), nanofibrous microspheres (shown in FIGS. 6A-6C), and nanofibrous spongy microspheres (shown in FIGS. 7A-7C). Examples of the scaffold 22' include the injectable hydrogel scaffolds and the implantable hydrogel scaffolds. As used herein, the term "injectable hydrogel" means a fluid or fluid-like polymer solution, which forms a three-dimensional shaped gel through cross-linking or curing after injection into a cavity or defect. Also as used herein, the term "implantable hydrogel" means a pre-crosslinked three-dimensional shaped gel, which can be implanted (not injected) into cavity or defect.

The polymer scaffold 22A including nanofibrous walls and interconnected pores is shown in FIGS. 4A through 4C. FIG. 4A is a perspective, schematic view of the polymer scaffold 22A. The polymer scaffold 22A is characterized as a multi-level porous structure with regular spherical macro-scale pores (ranging from about 250 μm to about 425 μm in diameter), micro-scale interpore openings (i.e., openings that connect one macro-scale pore to another macro-scale pore) ranging from about 10 μm to about 100 μm, and spaces (less than 2 μm in diameter) between the nanofibers. While the pores of the scaffold 22A are on the macro-scale or smaller, the scaffold itself has larger dimensions. For example, the thickness of the scaffold 22A may be 1 mm or more, and the length and/or width of the scaffold 22A may be 3 mm or more. FIG. 4B is representative of a cross-sectional view taken along the plane shown in FIG. 4A. In particular, FIG. 4B illustrates the regular spherical macro-scale pores and the micro-scale interpore openings. FIG. 4C illustrates the nanofibers of the nanofibrous shell 12. As shown in FIG. 4C, the nanofibrous shell 12 also includes spaces (less than 2 μm in diameter) that are present between the nanofibers. A polymer scaffold with a porous structure may be similar to the polymer scaffold 22A, except that the walls may be solid, rather than fibrous.

Figures 5A, 5B, 5C:
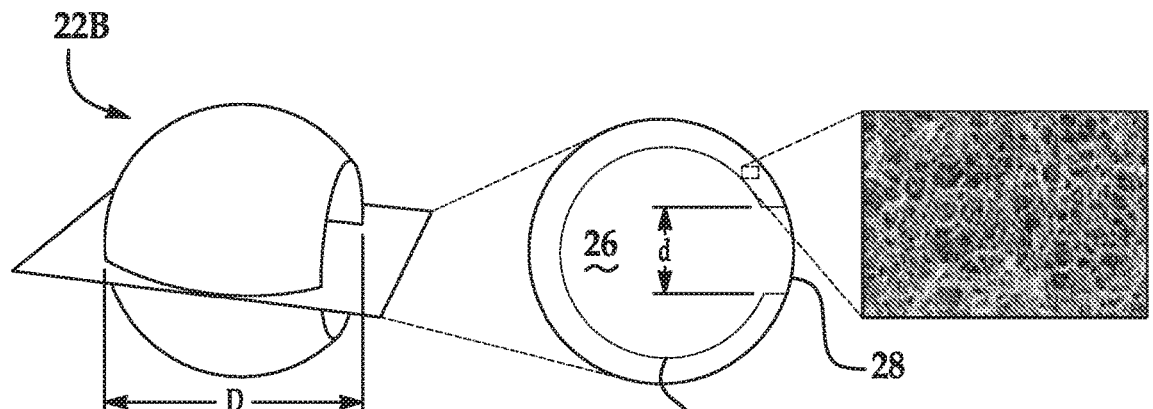
FIGS. 5A through 5C respectively depict a schematic, perspective view of a nanofibrous hollow microsphere, a cross-sectional view taken along the plane shown in FIG. 5A, and an enlarged view of nanofibers and spaces making up a shell of the nanofibrous hollow microsphere.
Figures 6A, 6B, 6C:
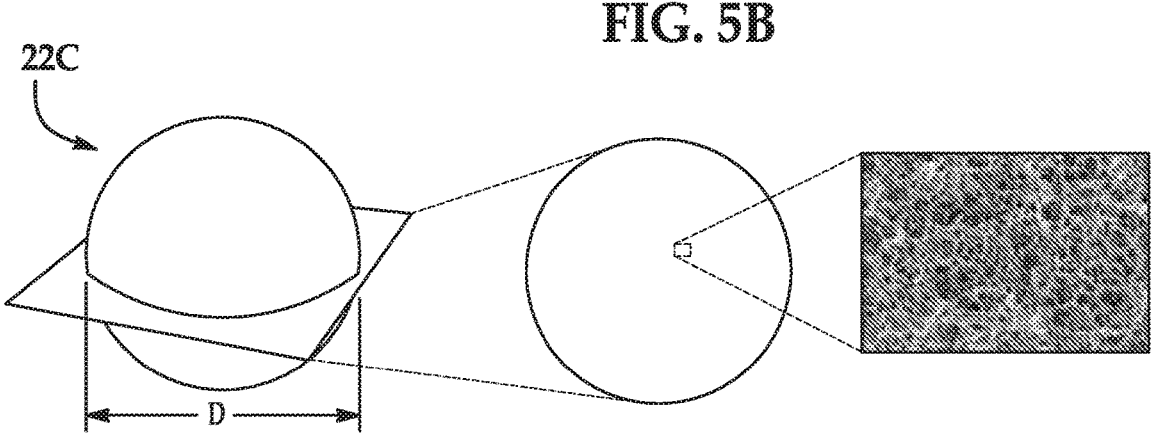
FIGS. 6A through 6C respectively depict a schematic, perspective view of a nanofibrous microsphere, a cross-sectional view taken along the plane shown in FIG. 6A, and an enlarged view of nanofibers and spaces making up the nanofibrous microsphere.

Examples of the injectable cell microcarriers are shown in FIGS. 5A-5C, 6A-6C and 7A-7C. FIGS. 5A through 5C depict a nanofibrous hollow microsphere 22B, FIGS. 6A through 6C depict a nanofibrous microsphere 22C, and FIGS. 7A through 7C a nanofibrous spongy microsphere 22D.

The nanofibrous hollow microsphere (NF-HMS) 22B is characterized as a hollow structure having a single hollow core surrounded by a nanofibrous shell, and one or more openings formed in the nanofibrous shell. An example of the NF-HMS is shown in FIGS. 5A through 5C. FIG. 5A is a perspective, schematic view of the NF-HMS, which includes the nanofibrous shell having a single opening. The entire hollow structure has a diameter D ranging from about 5 μm to about 1000 μm. FIG. 5B is a cross-sectional, schematic view taken along the plane shown in FIG. 5A (noting that the bottom of the sphere is not shown for clarity). In particular, FIG. 5B schematically illustrates the nanofibrous shell 24, the hollow core 26, and the opening 28 formed in the nanofibrous shell 24. The diameter $d_{op}$ of the opening 28 ranges from about 5 μm to about 50 μm. FIG. 5C illustrates the nanofibers of the nanofibrous shell 24. As shown in FIG. 5C, the nanofibrous shell 24 also includes spaces (less than 2 μm in diameter) that are present between the nanofibers.

The nanofibrous microsphere (NF-MS) 22C is characterized as a structure composed of nanofibers. An example of the NF-MS is shown in FIGS. 6A through 6C. FIG. 6A is a perspective, schematic view of the NF-MS, which does not include any openings. The entire structure has a diameter D ranging from about 5 μm to about 1000 μm. FIG. 6B is a cross-sectional, schematic view taken along the plane shown in FIG. 6A. In particular, FIG. 6B represents the fact that the nanofibers are present throughout the entire cross-section of the NF-HS. FIG. 6C illustrates the nanofibers and the spaces (less than 2 μm in diameter) present between the nanofibers.

Nanofibrous spongy microspheres 22D are spongy. By "spongy," it is meant that the NF-SMS have a sponge-like architecture throughout the entirety of the microsphere. The sponge-like architecture includes interconnected porous walls and micro-scale pores formed among the interconnected porous walls. An example of the NF-SMS and its sponge-like architecture is shown in FIGS. 7A-7C.

Figures 7A, 7B, 7C:
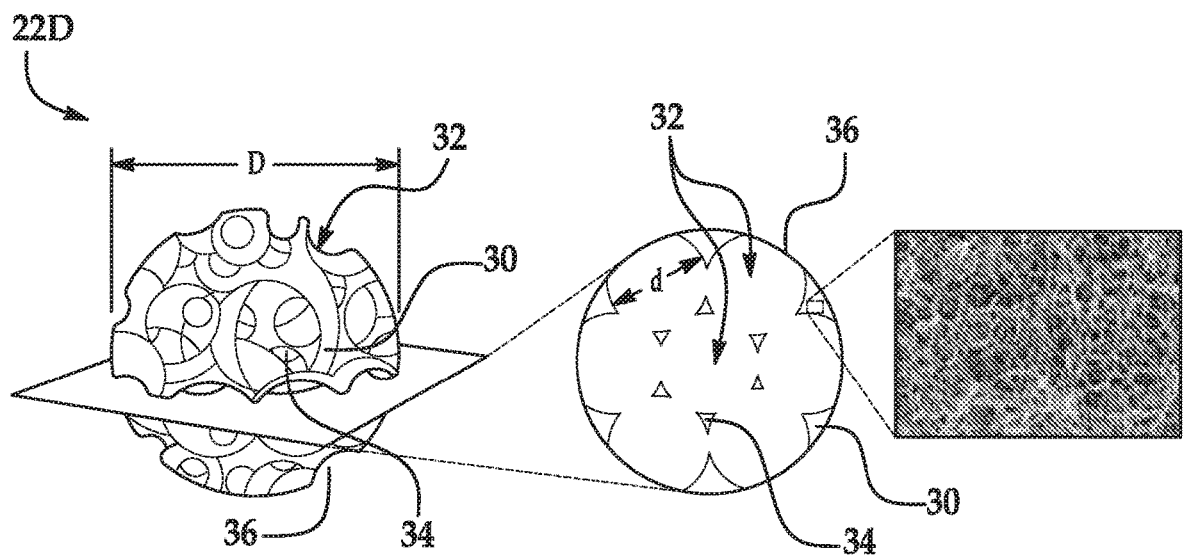
FIGS. 7A through 7C respectively depict a schematic, perspective view of a nanofibrous spongy microsphere, a cross-sectional view taken along the plane shown in FIG. 7A, and an enlarged view of nanofibers and spaces making up porous walls of the nanofibrous spongy microsphere.

FIG. 7A is a perspective, schematic view of the NF-SMS 22D. The diameter D ranges from about 5 μm to about 1000 μm. The sponge-like architecture includes the porous walls 30 that extend through an interior of the NF-SMS 22D and also define an exterior of the NF-SMS 22D. The porous walls 30 consist of interconnected nanofibers and spaces (less than 2 μm in diameter) formed between the interconnected nanofibers. The sponge-like architecture also includes a plurality of micro-scale pores 32 (ranging from about 1 μm to about 100 μm in diameter), interpore openings 34 (i.e., openings that connect one micro-scale pore 32 to another micro-scale pore 32), and, as previously mentioned, spaces between the nanofibers.

The micro-scale pores 32 are at least partially defined by the porous walls 30 and are formed throughout the NF-SMS 22D. As such, some of the micro-scale pores 32 are positioned at the exterior of the NF-SMS 22D and others are positioned within the interior of the NF-SMS 22D. Each micro-scale pore 32 has at least one interpore opening 34. The interpore opening 34 connects two adjacent micro-scale pores 32. In other words, the interpore opening 34 opens up one micro-scale pore 32 to another micro-scale pore 32. Each interpore opening 34 of the NF-SMS 22D ranges from about 2 μm to about 80 μm in diameter. Some of the micro-scale pores 32 also have an additional opening 36 that opens the micro-scale pore 32 to the environment surrounding the NF-SMS 22D. It is to be understood that the micro-scale pores 32 positioned within the interior of the NF-SMS 22D include the interpore opening(s) 34 but do not include the additional opening(s) 36.

As illustrated in FIG. 7A, the exterior of the NF-SMS 22D is defined by some of the porous walls 30 and some of the micro-scale pores 32. As depicted, the exterior is not completely formed of nanofibers and spaces, which is unlike the NF-MS (22C) of FIG. 6A. While the exterior of the NF-SMS 22D may resemble the shell 24 with one or more openings 28 (like the NF-HMS of FIG. 5A), the NF-SMS 22D is unlike the NF-HMS because the openings 36 at the exterior of the NF-SMS 22D do not lead to a single hollow core.

FIG. 7B is a cross-sectional, schematic view taken along the plane shown in FIG. 7A (noting that the bottom portion of the sphere 22D is not shown for clarity). In particular, FIG. 7B schematically illustrates some of the nanofibrous porous walls 30, the micro-scale pores 32, the interpore openings 34, and the additional openings 36. FIG. 3C illustrates the nanofibers of the porous walls 30. As shown in FIG. 3C, the porous walls 30 also include spaces (less than 2 µm in diameter) that are present between the nanofibers.

Nanofibrous scaffolds 22A, nanofibrous hollow microspheres 22B, and nanofibrous microspheres 22C may be formed by phase separation and template leaching techniques or emulsification techniques in which glycerol is added to emulsify the polymer solution. Examples of methods that may be used to form the nanofibrous spongy microspheres are described in U.S. patent application Ser. No. 14/507,523, entitled "Nanofibrous Spongy Microspheres", which is incorporated herein by reference in its entirety.

Any suitable injectable hydrogel may be used as the scaffold 22'. Examples of suitable injectable hydrogels and methods for forming the same are described in International Patent Application Serial No. PCT/US2016/025637, entitled "Self-Integrating Hydrogels and Methods for Making the Same", which is incorporated herein by reference in its entirety.

Any suitable implantable hydrogel may be used as the scaffold 22'. Examples of the implantable hydrogel include a crosslinked alginate gel or a crosslinked polyethylene glycol (PEG) gel. The implantable hydrogel may be formed by dissolving the polymeric material in water with a source of a cross-linker, such as calcium ions, or a di- or multi-functional cross-linker, and/or by exposure to a physical condition, such as light or heat, to initiate gelation.

Incorporating the apoptosis-mimicking structure 10, 10' into or onto a scaffold 22, 22' creates the structure 20, 20', which is suitable for use in a tissue regeneration method. As an example, the structure 20, 20' may be introduced into a defect in any of the following: a bone, smooth muscle, blood vessel, heart valve, cardiac muscle, skeletal muscle, bladder, tendon, ligament, skin, fat, or cartilage to aid in tissue regeneration. The structure 20, 20' including the seeded apoptosis-mimicking structure 10, 10' may increase the recruitment of endogenous stem or progenitor cells, such as mesenchymal stem/progenitor cells. The apoptosis-mimicking structure 10, 10' targets macrophage efferocytosis, which results in recruitment of stem or progenitor cells into the 3D space defined by the scaffold 22 to regenerate tissues, such as critical-sized bone defect repair. This biomimetic immunomodulatory strategy results in bone regeneration without the need for exogenous cells.

To further illustrate the present disclosure, examples are given herein. It is to be understood that these examples are provided for illustrative purposes and are not to be construed as limiting the scope of the present disclosure.

EXAMPLES

Example 1

In Example 1, all of the numerical data is presented as mean±SD (standard deviation). All P values are two-tailed and P<0.05 is considered statistically significant. When performed, a one-way ANOVA test was applied to compare different groups using GraphPad InStat software (Graph-Pad).

Preparation of Biotin Modified Microspheres

To prepare HEMA-PLLA, HEMA was used as initiator and $Sn(Oct)_2$ was used as catalyst to induce the ring opening polymerization of LLA. LLA (40 mmol, 5.760 g), HEMA (4 mmol, 0.464 g), and $Sn(Oct)_2$ (0.4 mmol, 0.162 g) were well-mixed in a 25 mL round-bottom flask under a nitrogen gas ($N_2$) purge and were maintained at 140° C. for about 2 hours. The product was cooled down and dissolved in 20 mL dichloromethane (DCM). The polymer was precipitated out in 50 mL cold methanol, and then was vacuum dried.

The HEMA-PLLA was formulated into microspheres (MS) using an emulsion method. 1 ml of a 10% w/v HEMA-PLLA/DCM solution was emulsified into 20 ml polyvinyl alcohol (PVA) aqueous solution (1% w/v) using a probe sonicator at an output power of 10 W (Virsonic 100, Cardiner, NY) for about 20 seconds to create an oil-in-water emulsion. The emulsion was stirred at room temperature for about 3 hours to evaporate the DCM, and then was centrifuged at 6000 rpm for about 6 minutes to collect solid microspheres. The microspheres were washed with distilled water three times and freeze dried. The size of the microspheres ranged from about 1 µm to about 5 µm.

The HEMA-PLLA microspheres (containing 1 equivalent HEMA-PLLA) were dispersed in deionized water with excess cysteine (5 equivalents) and tris(2-carboxyethyl)phosphine (TCEP, 1 equivalent), and then the dispersion was purged with $N_2$ for about 10 minutes and stirred for about 2 hours at room temperature. This induced click reactions between the thiol groups of cysteine and surface alkene groups on the HEMA-PLLA microspheres. The HEMA-PLLA microspheres with cysteine attached at the surface (i.e., MS-cys, see FIG. 1B) were washed extensively using deionized water and lyophilized for 2 days.

Excess NHS-Biotin (5 equivalents) was dissolved in dimethyl sulfoxide (DMSO), and then added into an aqueous dispersion of the MS-cys. The mixture was stirred for about 3 hours at room temperature, and then washed 3 times and freeze-dried.

Figure 8:
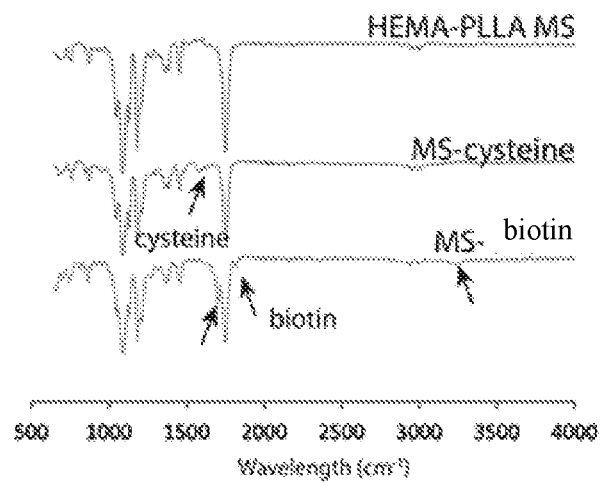
FIG. 8 depicts the Fourier transform infrared spectroscopy (FTIR) spectrums of microspheres before conjugation (top spectrum), after cysteine conjugation (middle spectrum, with the cysteine peak designated by the arrow), and after biotin conjugation (bottom spectrum, with biotin peaks designated by the arrows)

FTIR spectrums of the microspheres before functionalization, after cysteine functionalization, and after biotin functionalization were recorded with a Perkin Elmer 1800 FTIR spectrometer, wavelength from 600 $cm^{-1}$ to 4000 $cm^{-1}$. The results are shown in FIG. 8, and the FTIR spectrums confirmed the surface chemistry changes of the microspheres.

Figure 9:
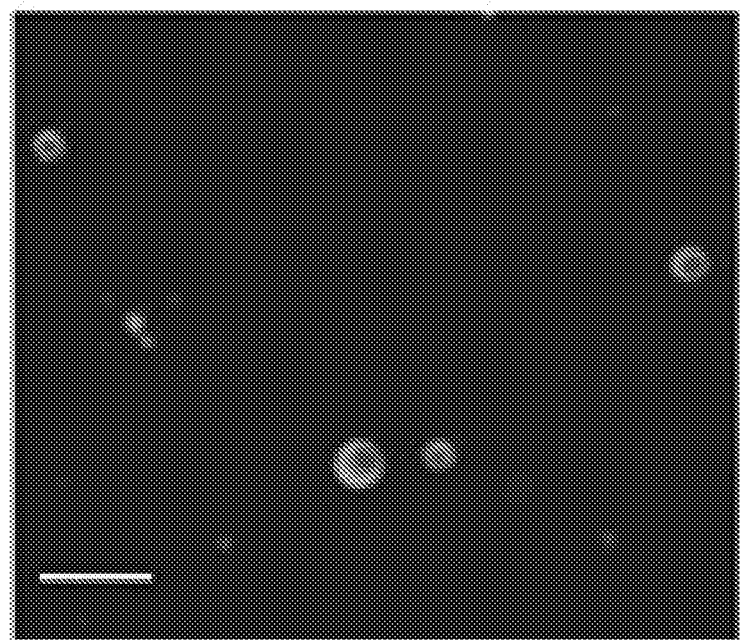
FIG. 9 is a confocal image of FITC-BSA conjugated to biotin modified microspheres at high magnification (scale bar=5 μm)

To further demonstrate the success of biotin modification of the microspheres and to visualize the conjugation sites, fluorescent moieties (fluorescein isothiocyanate labelled bovine serum albumin (FITC-BSA-biotin)) were conjugated to the prepared biotin modified microspheres through avidin and biotin interaction. As shown in FIG. 9, confocal imaging showed that a fluorescent signal was emitted from the surface of the biotin modified microspheres. The results in FIG. 9 indicated that biotin groups were distributed on the surface of the modified microspheres and that specific binding occurred. While the control group results are not shown, no fluorescent signal was observed from the control microspheres (i.e., HEMA-PLLA microspheres with $NH_2$-PEG-$NH_2$, biotin, and avidin, but no phosphatidylserine attached.

Preparation of Biotin Modified Eat Me Signaling Molecules

Phosphatidylserine (i.e., the eat me signaling molecule, PS, 1 equivalent) and $NH_2$-PEG-$NH_2$ (1 equivalent) were dissolved in a solution of chloroform and methanol (65:35). Dicyclohexylcarbodiimide (DCC, 1 equivalent) and 4-(dimethylamino) pyridine (DMAP, 1 equivalent) were added to the solution and the reaction mixture was stirred at room temperature for about 24 hours. As such, DCC/DMAP mediated Steglich esterification was used to conjugate the $NH_2$-PEG-$NH_2$ to the phosphatidylserine (which increased the hydrophilicity). Afterwards, the reaction mixture was filtered. 4 ml water was added and the mixture was concentrated in a rotary evaporator to remove chloroform and methanol. The remaining PS-PEG aqueous solution was then freeze-dried.

Excess NHS-Biotin (5 equivalents) was first dissolved in DMSO and added into the freeze-dried PS-PEG. The mixture was stirred for about 3 hours at room temperature, then transferred into a dialysis bag (molecular weight cut-off (MWCO) 1000 Da, Fisherbrand regenerated cellulose), then dialyzed against a continuous flow of deionized water for 2 days and freeze-dried.

Figure 10:
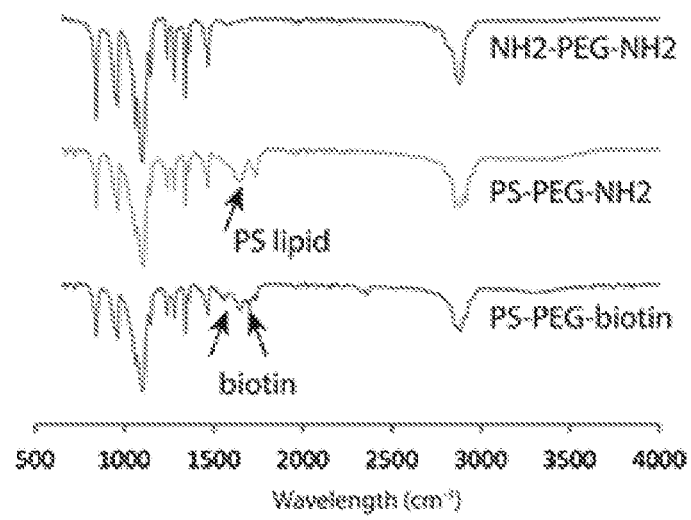
FIG. 10 depicts the FTIR spectrums of $NH_2$-PEG-$NH_2$ (top spectrum), eat me signaling molecules after $NH_2$-PEG-$NH_2$ conjugation (middle spectrum, the phosphatidylserine peak designated by the arrow), and eat me signaling molecules after biotin conjugation (bottom spectrum, with biotin peaks designated by the arrows)

FTIR spectrums of $NH_2$-PEG-$NH_2$, the eat me signaling molecule after $NH_2$-PEG-$NH_2$ functionalization, and eat me signaling molecule after biotin functionalization were recorded with a Perkin Elmer 1800 FTIR spectrometer, wavelength from 600 $cm^{-1}$ to 4000 $cm^{-1}$. The results are shown in FIG. 10, and the FTIR spectrums confirmed the chemical structure of the modified eat me signaling molecules.

Figure 11:
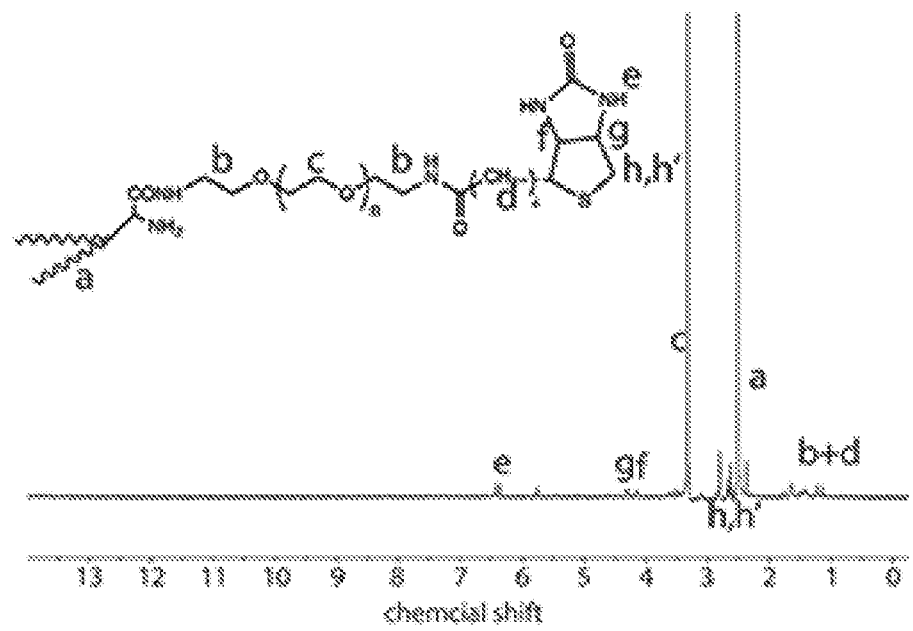
FIG. 11 depicts the 1H Nuclear Magnetic Resonance spectrum of biotin modified eat me signaling molecules.

1H spectra of the biotin modified eat me signaling molecules were obtained with an Inova 400 NMR instrument operating at 400 MHz at room temperature using deuterated chloroform (CDCl3) as the solvent. The results are shown in FIG. 11, and the NMR spectrum confirmed the chemical structure of the modified eat me signaling molecules.

Conjugation Between Biotin Modified Microspheres and Biotin Modified Eat Me Signaling Molecules The biotin modified microspheres were first dispersed in water. Avidin was added to the mixture. The mixture was stirred for 10 minutes and varying amounts of the biotin modified eat me signaling molecules were added. The ratio of avidin to biotin modified eat me signaling molecule was 1 mg avidin to 10 μg biotin. The mixture was stirred for another 40 minutes, and then centrifuged. The resulting apoptosis mimicking structures were washed extensively with water 5 times, and then freeze-dried.

Immunochemical staining was used to visualize the conjugation of the biotin modified eat me signaling molecule onto the biotin modified microspheres. The microspheres were labeled with FITC (green fluorescence) in both a control group (i.e., HEMA-PLLA microspheres with $NH_2$-PEG-$NH_2$, biotin, and avidin, but no phosphatidylserine attached) and an apoptosis mimicking structures group. The biotin modified eat me signaling molecules were labeled with TRITC tagged Annexin V (red fluorescence). It was found that the Annexin V was specifically bound to the apoptosis mimicking structures but not to the control microspheres, indicating that the biotin modified eat me signaling molecules were successfully conjugated onto the biotin modified microspheres in the apoptosis mimicking structures (compare FIGS. 12A and 12B).

The apoptosis mimicking structures were incubated in nonionic water at 70° C. for 5 minutes, and then centrifuged. The incubation was performed to break the biotin modified eat me signaling molecule bonds from the biotin modified microsphere surfaces. In other words, the incubation eluted the biotin modified eat me signaling molecules from the apoptosis mimicking structures. The amount of biotin modified eat me signaling molecules in the supernatant was determined using Biotin Quantitation Kits (ThermoFisher, USA). HEMA-PLLA microspheres conjugated with $NH_2$-PEG-$NH_2$, biotin, and avidin, but no phosphatidylserine were used as control microspheres to rule out hydrophilicity effects between the two groups. The results are shown in FIG. 12C, which indicate that as much as 85% of the biotin modified eat me signaling molecules were conjugated at various feeding amounts.

Phagocytosis of Apoptosis Mimicking Structures In Vitro

Primary bone marrow cells were collected from 4 to 8-week old C57BL/6J mice. Bone marrow-derived macrophages (BMMs) were differentiated in vitro from bone marrow flush in α-MEM medium (10% FBS, Pen/Strep, glutamine) with murine M-CSF (30 ng/mL eBioscience) for 6 days. At day 7, macrophages were plated in $3 \times 10^5$ cells/well in 12-well plates (for phagocytosis assays) or $1.0 \times 10^6$ cells/well in 6-well plates (for protein/RNA).

The apoptosis mimicking structures and control microspheres (i.e., HEMA-PLLA microspheres with $NH_2$-PEG-$NH_2$, biotin, and avidin, but no phosphatidylserine attached) were co-cultured with the BMMs to study phagocytosis in vitro.

Transmission electron microscopic (TEM) images of the BMMs were taken for both the cellular ultrastructural analysis and the assessment of microsphere internalization. The BMMs ($1.0 \times 10^6$ cells/mL) were plated in 6-well plates, and were then allowed to adhere for 24 hours. Next, the cell medium was withdrawn and replaced by α-MEM medium supplemented with 0.2% FBS (fetal bovine serum). The apoptosis mimicking structures and control microspheres were added to the different BMM culture plates (at a ratio of microspheres:macrophages=5:1) and incubated for 1 hour. After the incubation period, the cellular medium was replaced by a fixative solution containing 2.5% glutaraldehyde (0.1 mol/L), sodium cacodylate buffer (0.1 mol/L, pH 7.4), and calcium chloride (3 mmol/L) for 5 minutes at room temperature, followed by 1 hour in an ice bath. Next, the cells were rinsed with cacodylate buffer/calcium chloride and were post-fixed with 1% osmium tetroxide, cacodylate buffer (0.1 mol/L), calcium chloride (3 mmol/L), and potassium ferrocyanide solution (0.8%) for 30 minutes on ice. The cells were scraped off from the plate and washed with deionized (DI) water, then dehydrated in an ascending series of ethanol (20, 50, 70, 80%, and twice at 100%). The cells were embedded in Epon 812 resin for 72 hours and placed in an oven for polymerization at 60° C. The monolayer culture ultra-thin sections were stained with uranyl acetate and lead citrate, then transferred to uncoated copper grids and examined in a Zeiss LEO 902 transmission electron microscope at an accelerating voltage of 60 kV. The TEM images are shown in FIGS. 13A through 13C. FIG. 13A includes images of the BMMs, FIG. 13B includes images of the engulfment of the control microspheres, and FIG. 13C includes images of the engulfment of the apoptosis mimicking structures. These images illustrate that both types of microspheres can be engulfed by macrophages and keep their original spherical shape inside the cells.

Figures 14A, 14B, 14C, 14D:
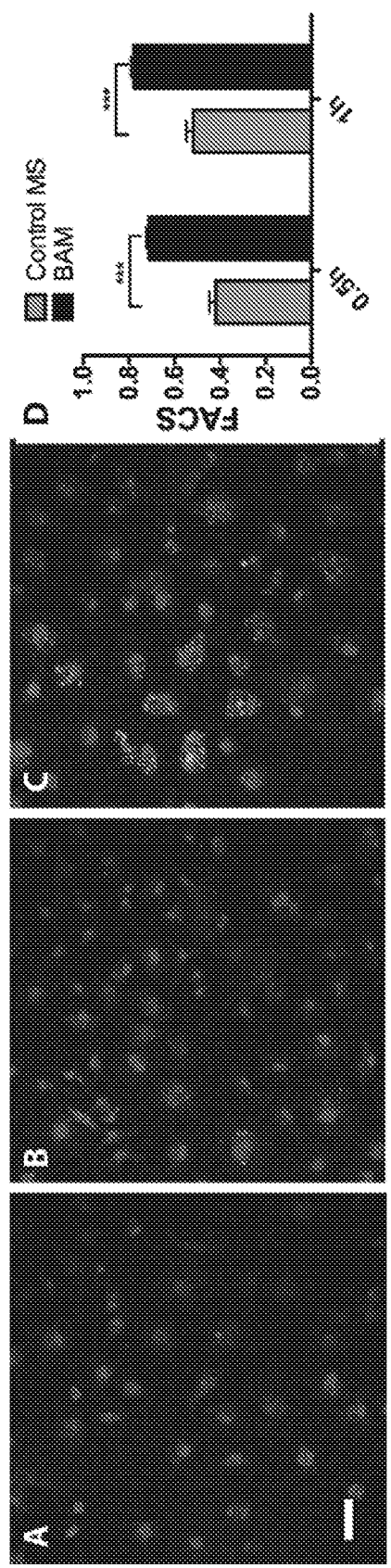
FIGS. 14A through 14C are confocal images of macrophages (A) and FITC-tagged control $NH_2$-PEG-$NH_2$ modified microspheres (B) or FITC-tagged apoptosis mimicking structures (C) engulfed by macrophages 1 hour after incubation (scale bar=10 µm)
FIG. 14D is a graph of flow cytometry analysis, depicting that apoptosis mimicking structures (labeled BAM) were more efficiently internalized by macrophages at 30 minutes and 1 hour compares with control $NH_2$-PEG-$NH_2$ modified microspheres (labeled Control MS) (N=3 per group, ***P<0.005)

For confocal imaging, the BMMs were plated in 1.5-mm coverglass chambers ($8\times10^4$ cells/well) and stained with CellTracker DeepRed for 1 hour before the phagocytosis study. The apoptosis mimicking structures and control microspheres were added into different wells (at a ratio of microspheres:macrophages=6:1). After 0.5 and 1 hour co-cultures, BMMs were fixed with ice-cold methanol for 20 minutes. Cells were then washed with PBS and covered with ProLong® Gold antifade reagent with DAPI (Life Technologies). Confocal microscopy images were taken and analyzed using the Leica inverted SPSX confocal microscope system with two-photon film and Leica software (Leica Microsystems). The confocal images are shown in FIGS. 14A through 14C. These images also revealed that the macrophages appeared to internalize the particles and engulf more apoptosis mimicking structures than control microspheres.

Macrophages were also stained by CellTracker DeepRed before adding the apoptosis mimicking structures or the control microspheres. A control group of macrophages did not have any microspheres (i.e., apoptosis mimicking structures or control microspheres) added thereto. A total of $1.8\times10^6$ apoptosis mimicking structures or control microspheres (at a ratio of microspheres/macrophages=6:1) were added into wells of the macrophage seeded 12-well plate ($\alpha$-MEM medium, 0.2% FBS). After 0.5 hours (30 minutes) and 1 hour, BMMs co-cultured with microspheres were harvested and stained with F4/80-PE (Abd Serotec, CI:A3-1). The co-cultures were fixed with 1% formalin and phagocytosis was assessed via flow cytometric (FACs) analyses (BD FACSAriaTM III) for double labeled cells (FITC+PE+) reflecting engulfment. The quantitative FACs data is shown in FIG. 14D. This data confirmed that significantly more macrophages internalized apoptosis mimicking structures than macrophages internalized control microspheres at 0.5 hour and 1 hour in the co-culture. These results indicated that the eat me signaling molecule (phosphatidylserine) modifications successfully mimicked apoptotic cells and enhanced the phagocytosis.

In Vitro Response of the Engulfment of Microspheres

To study the response of macrophages after phagocytosis of different particles, macrophages (BMMs) were cultured alone, co-cultured with apoptosis mimicking structures, and co-cultured with the control microspheres.

Figures 15A, 15B, 15C, 15D:
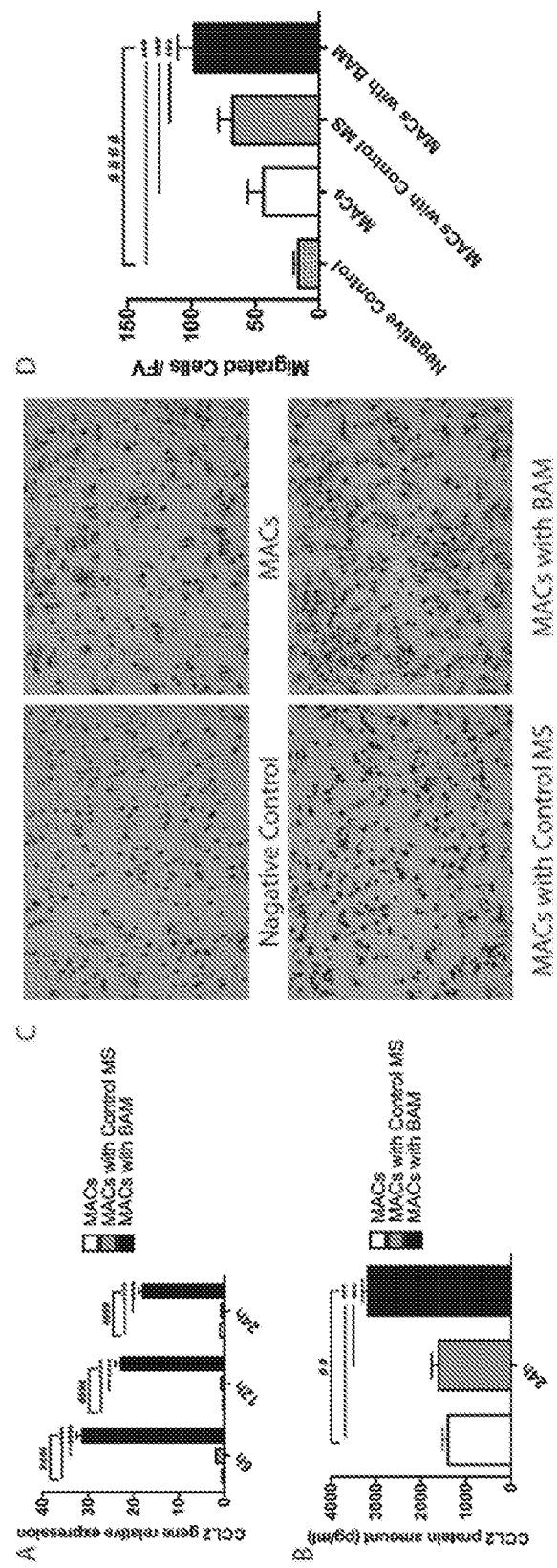
FIG. 15A is a graph depicting the CCL-2 production by macrophages in terms of gene expression in cultures of macrophages alone (MACs), macrophages with control microspheres (MACs with control MS), and macrophages with apoptosis mimicking structures (MACs with BAMs) after 6 hours, 12 hours, and 24 hours of culture (N=3, ****P<0.0001, #### P<0.0001)
FIG. 15B is a graph depicting the CCL-2 production by macrophages in terms of protein level (pg/mL) in culture supernatants of macrophages alone (MACs), macrophages with control microspheres (MACs with control MS), and macrophages with apoptosis mimicking structures (MACs with BAMs) (N=3, ****P<0.0001, #### P<0.0001)
FIG. 15C are photo micrographic images of the transwell migration assay of mouse BMSCs cultured for 8 hours in conditioned media of macrophages alone (MACs), macrophages with control microspheres (MACs with control MS), and macrophages with apoptosis mimicking structures (MACs with BAM (i.e., biodegradable apoptosis mimicking microspheres))
FIG. 15D is a graph depicting the number of cells migrated during the transwell migration assay, the cells were counted after fixation and hematoxylin staining (N=8, ***P<0.0005, #### P<0.0001)

After 6, 12, and 24 hours of co-culture, RNA was isolated using the Qiagen RNeasy Mini Kit. Reverse transcription PCR was conducted. The cDNA products were amplified and detected using TaqMan Universal PCR master mix (Applied Biosystems) and TaqMan probes. Mouse CCL-2 (Mm00441242 ml) was used as an endogenous control. Real time PCR analysis was performed on ABI PRISM 7700 (AppliedBiosystems). The CCL-2 gene level expression results are shown in FIG. 15A. The gene level expression results showed control microspheres (labeled MACs with Control MS) increased CCL-2 gene expression at the early stage when compared with macrophages (labeled MACs) alone. The apoptosis mimicking structures (labeled MACs with BAM) increased CCL-2 gene expression of macrophages by 20 times or higher when compared with the control microspheres at the three time points studied. This increase was observed at all time points.

Supernatants were also collected after 24 hours of co-culture. The CCL-2 protein levels in culture supernatants were measured with the Quantikine mouse CCL-2 ELISA (R&D systems) per manufacturer's instructions. Supernatant samples, standards, and controls were added to anti-mouse CCL-2 antibody pre-coated microplates and incubated at room temperature for 2 hours. Wells were washed and incubated with CCL-2 conjugate for 2 hours. Afterwards, the wells were washed and substrate solution was added. The wells were incubated for an additional 30 minutes. Stop solution was added and A450 values (corrected with A570) were measured using an EZ Read 400 microplate reader (Biochrom). The protein level analysis results are shown in FIG. 15B, and are consistent with the gene expression data in FIG. 15A. The protein level analysis showed increased CCL-2 protein levels in macrophage and apoptosis mimicking structure co-cultures (labeled MACs with BAM). As shown in FIG. 15B, no significant difference was observed between control microsphere/macrophage co-culture group (labeled MACs with Control MS) and macrophage alone group (labeled MACs).

The macrophage culture, co-cultures with apoptosis mimicking structures, and co-cultures with the control microspheres were also used in transwell assays to determine in vitro bone marrow stromal cell migration. Bone marrow stromal cells (BMSCs) were derived from bone marrow flush, and were cultured in $\alpha$-MEM medium (20% FBS, Pen/Strep, glutamine) for one time (passage) after isolation.

Cell migration was assessed in 24-well plate transwells (Corning, Inc.) with a diameter of 6.5 mm and a pore size of 8 µm coated with 0.2 mg/mL collagen type I (EMD Millipore). BMSCs were placed in the upper chambers. Conditioned media from the macrophage culture, the co-cultures, or $\alpha$-MEM medium (a negative control) containing CCL-2 protein and 0.2% FBS were added to the lower chambers. After 8 hours, cells were fixed with 2.5% glutaraldehyde for 15 minutes. Cells which remained on top of transwell membranes were removed with cotton swabs. Cells that had migrated through the pores to the lower surface were stained with Gill's Hematoxylin (Sigma-Aldrich). Four fields at 200× magnification were selected at random, photo micrographic images were obtained (shown in FIG. 15C), and the cells in each image were counted (results shown in FIG. 15D). As depicted in FIG. 15D: the conditioned medium collected from macrophages alone (labeled MACs) increased BMSCs migration when compared to the control medium (labeled negative control); the conditioned medium from macrophage and control microsphere co-cultures (labeled MACs with control MS) indicated about 2 times more BMSCs migration when compared to the control medium; and the conditioned medium from macrophage and apoptosis mimicking structure co-cultures (labeled MACs with PS MS) resulted in up to 4 times more BMSC migration when compared to control medium.

Different concentrations of recombinant CCL-2 were also examined for increasing BMSC migration. The results (not shown) indicated that a concentration of 10 ng/ml CCL-2 can increase BMSCs migration by about 70% when compared with the control medium. However, CCL-2 concentration up to 100 ng/ml did not cause further increase in BMSCs migration. These results suggest that apoptosis mimicking structures could stimulate macrophages to secrete cytokines, such as CCL-2, which contributed to recruitment of more BMSCs.

Preparation of Scaffolds With Immobilized Microspheres

Three-dimensional nanofibrous poly(lactide) (PLLA) scaffolds with inter-connected spherical pores were fabricated. Fructose sugar spheres were made by an emulsion technique. 50 g of fructose was melted at 130° C. until it formed a clear, light yellow liquid. The liquefied sugar was gradually added into 50 mL of mineral oil with 1.5 mL Span 80 under vigorous stirring for about 3 minutes to create an emulsion. The mixture was cooled down in an ice-bath to solidify the sugar spheres, and sifted with standard sieves to separate the sugar spheres by size. Spheres of desired-size (ranging from about 250 μm to about 420 μm) were collected, washed with hexane three times, and then added to a TEFLON® mold. The mold was heat-treated at 37° C. for about 15 minutes to achieve the desired inter-connected pore structure, and then was placed under vacuum to remove hexane.

PLLA/THF (10% w/v solution) was cast into the sugar sphere assembly and the whole construct was stored at about −80° C. overnight to induce phase separation. The phase-separated samples were immersed in distilled water to extract the solvent and leach away sugar spheres, leaving behind polymer scaffolds. The polymer scaffolds were freeze-dried and cut into thin disks (5 mm diameter and 1 mm thickness).

The apoptosis mimicking structures were immobilized onto the polymer scaffolds via a solvent treatment method. The apoptosis mimicking structures were suspended in hexane, and the suspension was seeded onto the polymer scaffolds. The seeded polymer scaffolds were then subjected to a mixed solvent of hexane/THF (volume ratio of 90/10). This immobilized the apoptosis mimicking structures on the scaffolds. The scaffolds were vacuum dried for 3 days to remove the solvent.

Comparative scaffolds were prepared in a similar manner with the control microspheres (i.e., HEMA-PLLA microspheres with $NH_2$-PEG-$NH_2$, biotin, and avidin, but no phosphatidylserine attached).

In Vivo Subcutaneous Implantation of Scaffolds With Immobilized Microspheres

The example structure (i.e., scaffolds having the apoptosis mimicking microspheres immobilized thereon) and the comparative structure (i.e., scaffolds having the control microspheres immobilized thereon) were subcutaneously implanted in mice to study the in vivo response to the structures.

C57BL/6J mice were randomly divided into 3 groups. The animals were anaesthetized with isoflurane (2%) inhalation. A 5 mm craniotomy defect centered on the parietal calvarial bone was created using a trephine. In some mice, a plain polymer scaffold was placed to fill in the defect (i.e., as a blank). In other mice, the example structure was placed to fill in the defect. In still other mice, the comparative structure was placed to fill in the defect.

At day 4 and day 7 after implantation, the example and comparative structures were harvested from some of the mice. All of the mice were euthanized 8 weeks after implantation and the skulls were harvested.

Figures 16A, 16B, 16C, 16D:
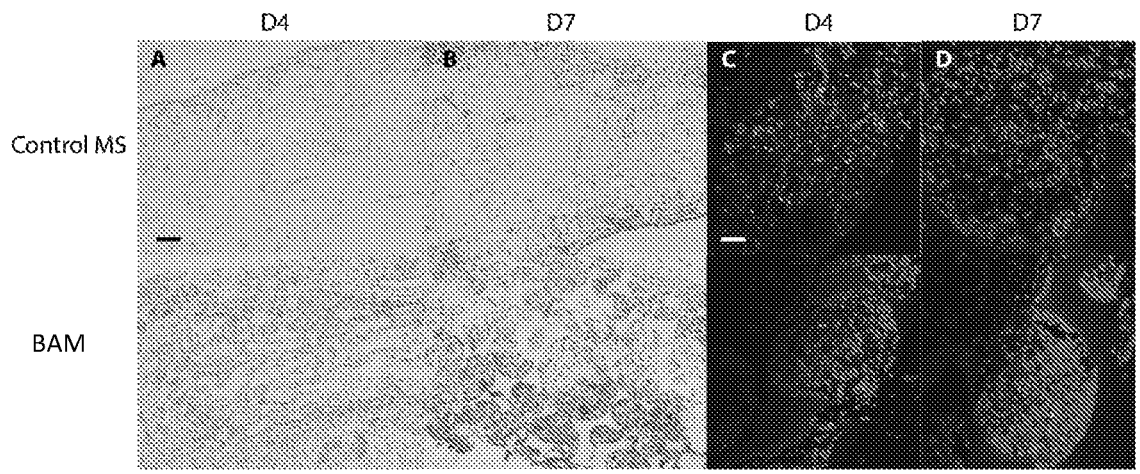
FIGS. 16A through 16D depict the Trichrome staining (A and B) and the F4/80 immunohistological staining (C and D) of comparative structures (i.e., scaffolds with immobilized control microspheres) (top panel, labeled control MS) and example structures (i.e., scaffolds with immobilized apoptosis mimicking structures) (bottom panel, labeled BAM) at 4 days (D4) and 7 days (D7) after subcutaneous implantation (scale bar=50 µm)

The example and comparative structures harvested at days 4 and 7 were stained with trichrome staining and F4/80 immunohistological staining. The trichrome stained structures are shown in FIGS. 16A (day 4, comparative structure (i.e., Control MS) is shown in the top panel, example structure (i.e., BAM) is shown in the bottom panel) and 16B (day 7, comparative structure is shown in the top panel, example structure is shown in the bottom panel), and the F4/80 immunohistological stained structures are shown in FIGS. 16C (day 4, comparative structure is shown in the top panel, example structure is shown in the bottom panel) and 16D (day 7, comparative structure is shown in the top panel, example structure is shown in the bottom panel). Trichrome staining (FIGS. 16A and 16B) showed that higher numbers of inflammatory cells were seen surrounding and infiltrating the example structures when compared to the comparative structures. F4/80 immunohistological staining (FIGS. 16C and 16D) also indicated that the example structures could recruit higher numbers of F4/80 positive (red) macrophages into the scaffold.

Figures 17A, 17B, 17C:
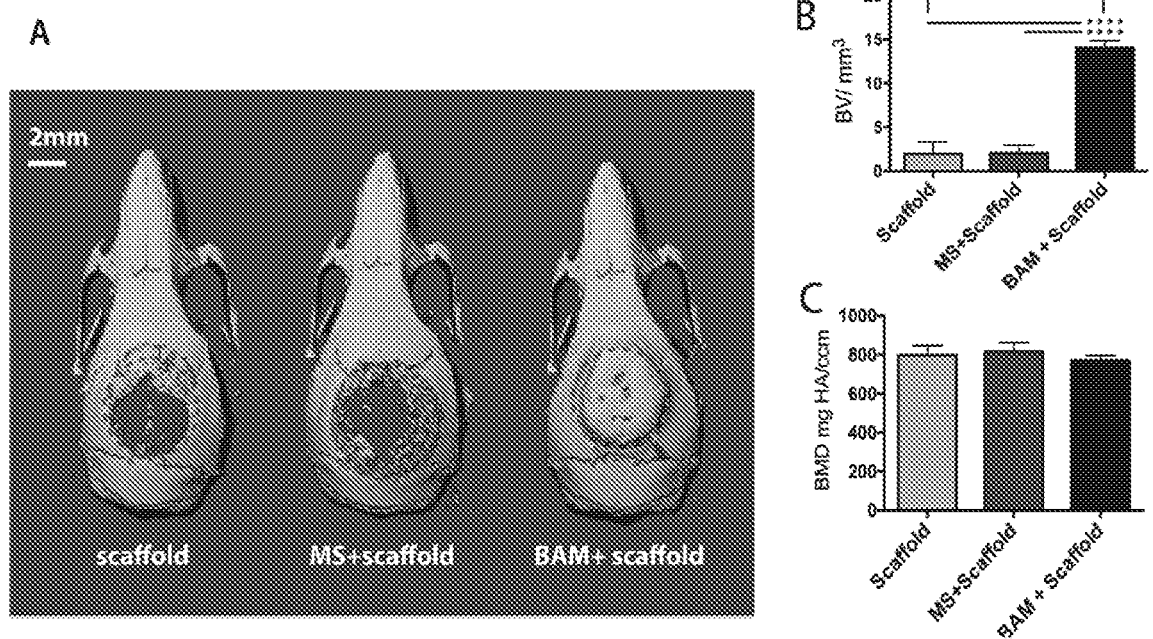
FIGS. 17A through 17C illustrate the µCT characterization of critical-sized defect repairs after different scaffolds (i.e., plain scaffold, scaffold with control microspheres (i.e., MS+Scaffold), and scaffold with apoptosis mimicking structures (i.e., BAM+Scaffold)) were implanted for 8 weeks, where A depicts the representative µCT reconstructions of the mouse calvarial defects, B depicts the new bone volume, and C depicts the new bone mineral density (N=6 per group, ****P<0.0001, #### P<0.0001)

The skulls harvested after the 8 week period were placed in a 34 mm diameter specimen holder and scanned over the entire length of the calvaria using a microCT system (μCT100 Scanco Medical, Bassersdorf, Switzerland). The scan settings were: voxel size 18 μm, 70 kVp, 114 μA, 0.5 mm AL filter, and integration time 500 ms. Analysis was performed using the manufacturer's evaluation software, and a fixed global threshold of 18% (180 on a grayscale of 0-1000) was used to segment bone from non-bone. 3D reconstruction of the skull and quantitative analyses were performed. FIG. 17A depicts the representative μCT reconstructions of mouse calvarial defects in a skull with the plain polymer scaffold (labeled scaffold), a skull with the comparative structure (labeled MS+Scaffold), and a skull with the example structure (labeled BAM+Scaffold). As shown in FIG. 17A, the bone defect was completely repaired in the skull that had the example structure implanted therein.

A 5 mm-round region of interest (shown in red dotted line in FIG. 17A) centered on the defect was identified in the harvested skulls, and the bone volume ($mm^3$) (BV) and bone mineral density (BMD) in the area were measured using manufacturer's software (Scanco mCT 100). The new bone volume is shown in FIG. 17B and the new bone mineral density is shown in FIG. 17C. As depicted in these graphs, eight weeks after implantation, similar amounts of bone formed in the plain scaffold and the comparative structure (i.e., MS+scaffold), indicating that the biomimetic nanofibrous scaffold could promote bone repair via enhanced osteoblasts differentiation and biomineralization. The new bone volume of the example structure (i.e., BAM+scaffold) also supports the reconstruction finding that the bone defect was completely repaired in the skull that had the example structure implanted therein. Clearly, these results illustrate that the apoptosis mimicking structures in combination with the polymer scaffold recruited stem and progenitor cells, and thus maximized bone regeneration.

Example 2

In this example, apoptosis mimicking microspheres were formed via a direct click reaction between phosphatidylserine (the eat me signaling molecule) and HEMA-PLLA microspheres (which were formed as described in Example 1).

Thiol groups were first introduced onto the phosphatidylserine in order to prepare the east me signaling molecules for the direct click reaction. PS-PEG was prepared as described in Example 1 using phosphatidylserine and $NH_2$-PEG-$NH_2$. 3-mercaptopropionic acid (1.1 equivalent) was dissolved in distilled water and EDC/NHS (1 equivalent) was added. This was added to the PS-PEG (1 equivalent). The reaction mixture was stirred at room temperature for 5 hours. The mixture was then transferred to dialysis bag (molecular weight cut-off (MWCO) 1000 Da, Fisherbrand regenerated cellulose), dialyzed against a continuous flow of deionized water for 2 days, and freeze-dried to get thiol functionalized eat me signaling molecules (PS-PEG-SH, see FIG. 2A).

HEMA-PLLA microspheres were dispersed in deionized water with PS-PEG-SH and TCEP, and then the dispersion was purged with $N_2$ for 10 minutes, and stirred for 2 hours at room temperature. This induced click reactions between the thiol groups of the eat me signaling molecule and the surface alkene groups on the microspheres to form apoptosis mimicking microspheres (e.g., as shown in FIG. 2B).

Figure 18:
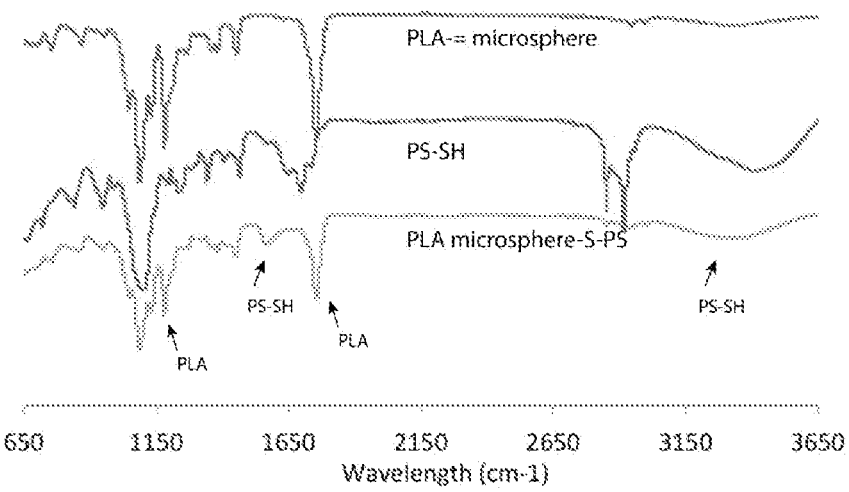
FIG. 18 depicts the FTIR spectrums of microspheres before conjugation (top spectrum), of an eat me signaling molecule after thiol group introduction (middle spectrum), and after conjugation to form an example of the apoptosis mimicking structure (bottom spectrum, with microsphere peaks designated by the arrows and PLA and the eat me signaling molecule designated by the arrows and PS-SH)

FTIR spectrums of the microspheres before conjugation (labeled PLA-=microsphere), the phosphatidylserine after introduction of the thiol groups (labeled PS-SH), and the apoptosis mimicking structure (labeled PLA microsphere-S-PS) were recorded with a Perkin Elmer 1800 FTIR spectrometer, wavelength from 650 cm$^{-1}$ to 3650 cm$^{-1}$. The results are shown in FIG. 18. The FTIR spectrums indicate the successful conjugation of the eat me signaling molecule onto the PLLA microsphere.

Example 3

In this example, apoptosis mimicking microspheres were formed via a direct click reaction between phosphatidylserine (the eat me signaling molecule) and hydrogel microspheres.

Thiol groups were first introduced onto the phosphatidylserine to form PS-PEG-SH, as described in Example 2.

Figure 19:
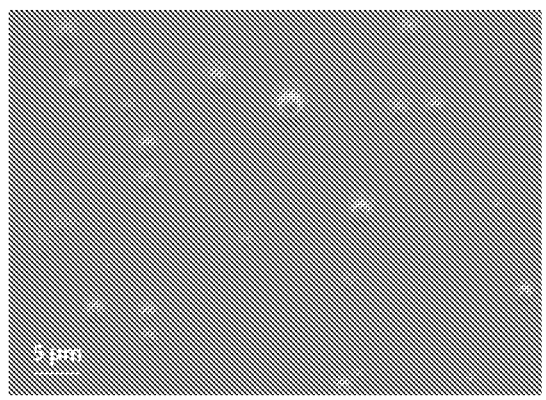
FIG. 19 is a scanning electron micrograph (SEM) image of polyethylene glycol hydrogel microspheres.

To form the hydrogel microspheres via emulsion polymerization, PEG diacrylate (Mw 500) was used. The PEG (1 ml) and a cross-linker (N,N'-methylenebisacrylamide (0.15 g)) and ammonium persulfate (0.02 g) were dissolved in 50 ml of distilled water in a round bottom flask, which was bubbled with $N_2$ gas for about 30 minutes to remove the dissolved oxygen. 0.27 g of sodium dodecyl sulfate was then added and $N_2$ gas was blown for another 30 minutes. The polymerization was initiated by heating the reaction to 70° C. in an oil bath. After about 10 minutes, the reaction was terminated by cooling the reaction flask in a water-ice bath. The gel particles were collected by centrifuge and washed 3 times followed by freeze-drying. A scanning electron micrograph (SEM) of the PEG hydrogels is shown in FIG. 19.

PEG hydrogel microspheres were dispersed in deionized water with PS-PEG-SH and TCEP, and then the dispersion was purged with $N_2$ for 10 minutes, and stirred for 2 hours at room temperature. This induced click reactions between the thiol groups of the eat me signaling molecule and the surface alkene groups on the hydrogel microspheres to form apoptosis mimicking microspheres.

Figure 20:
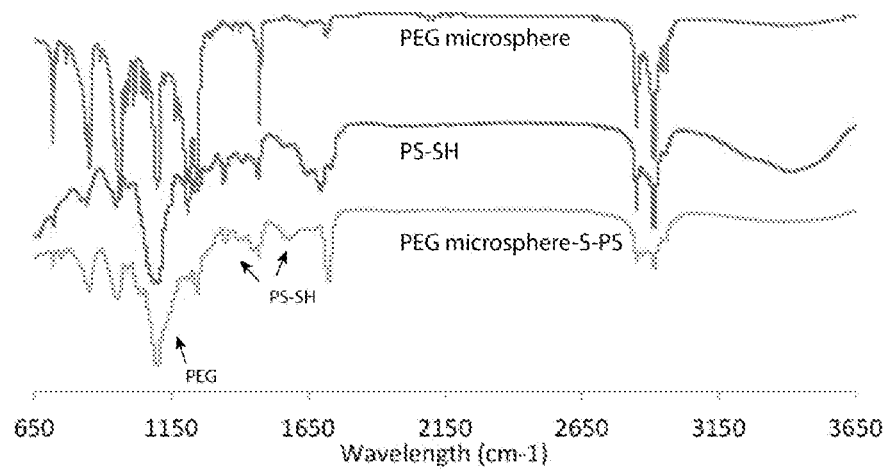
FIG. 20 depicts the FTIR spectrums of hydrogel microspheres before conjugation (top spectrum), of an eat me signaling molecule after thiol group introduction (middle spectrum), and after conjugation to form an example of the apoptosis mimicking structure (bottom spectrum, with hydrogel microsphere peaks designated by the arrows and PEG and the eat me signaling molecule designated by the arrows and PS-SH)

FTIR spectrums of the hydrogel microspheres before conjugation (labeled PEG microsphere), the phosphatidylserine after introduction of the thiol groups (labeled PS-SH), and the apoptosis mimicking structure (labeled PEG microsphere-S-PS) were recorded with a Perkin Elmer 1800 FTIR spectrometer, wavelength from 650 cm$^{-1}$ to 3650 cm$^{-1}$. The results are shown in FIG. 20. The FTIR spectrums indicate the successful conjugation of the eat me signaling molecule onto the PEG hydrogel microsphere.

Example 4

In this example, a blend of biodegradable polymers was used to make microspheres.

HEMA-PLLA (formed as described in Example 1) and poly(lactic-co-glycolic acid) (PLGA) were dissolved in dichloromethane, and the solution was then gradually added into 20 mL aqueous polyvinyl alcohol solution (1% w/v) under sonication at an output power of 20 W to form an oil-in-water (o/w) emulsion. The solution was stirred at room temperature for about 3 hours to evaporate the dichloromethane, and then was centrifuged to collect solid microspheres. The resultant microspheres were washed with distilled water three times and then freeze dried.

Figure 21:
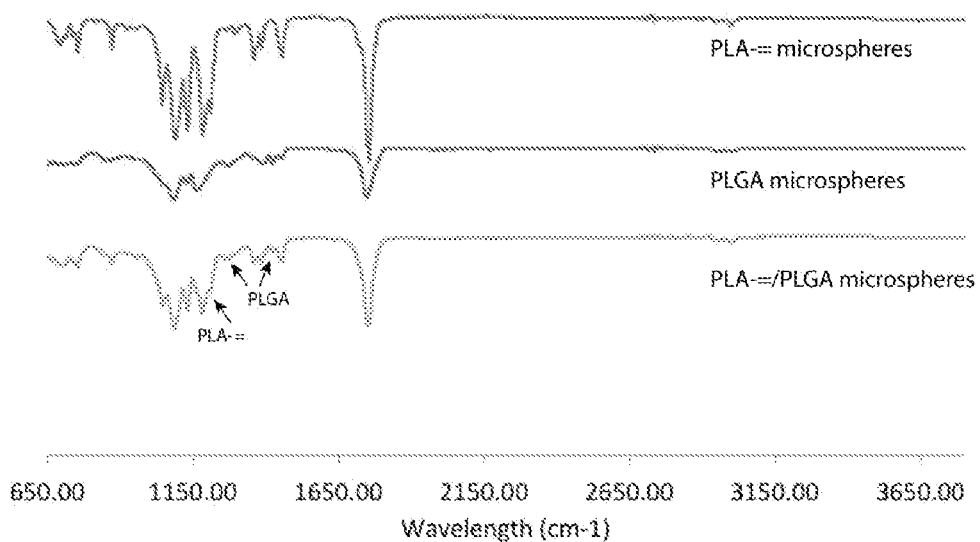
FIG. 21 depicts the FTIR spectrums of HEMA-PLLA (top spectrum), of PLGA (middle spectrum), and blended PLLA/PLGA microspheres (bottom spectrum, with PLLA peaks designated by the arrows and PLA, and the PLGA designated by the arrows and PLGA)

FTIR spectrums of HEMA-PLLA before blend microsphere formation (labeled PLA-=microsphere), the PLGA before blend microsphere formation (labeled PLGA microsphere), and the blended microspheres (labeled PLA-=/PLGA microsphere) were recorded with a Perkin Elmer 1800 FTIR spectrometer, wavelength from 650 cm$^{-1}$ to 3400 cm$^{-1}$. The results are shown in FIG. 21. The FTIR spectrums indicate that the blend microspheres had the signature peaks from both PLGA microspheres and HEMA-PLLA microspheres.

Example 5

In this example, apoptosis mimicking microspheres were formed as described in Example 1 (i.e., the biotin modified HEMA-PLLA polymer microspheres conjugated to the biotin modified phosphatidylserine.

The apoptosis mimicking microspheres were incorporated into a PEG hydrogel matrix (which acts as a scaffold that embeds the apoptosis mimicking microspheres). PEG diacrylate (Mw 500) was used in this example. The apoptosis mimicking microspheres were dispersed in a PEG/water solution (20% w/v) by vortex or sonication to obtain an at least substantially uniform dispersion. A photoinitiator (1% w/w 2-Hydroxy-4'-(2-hydroxyethoxy)-2-methylpropiophenone) was added and the mixture was subjected to UV light for 10 minutes to induce the gelation.

Figures 22A, 22B:
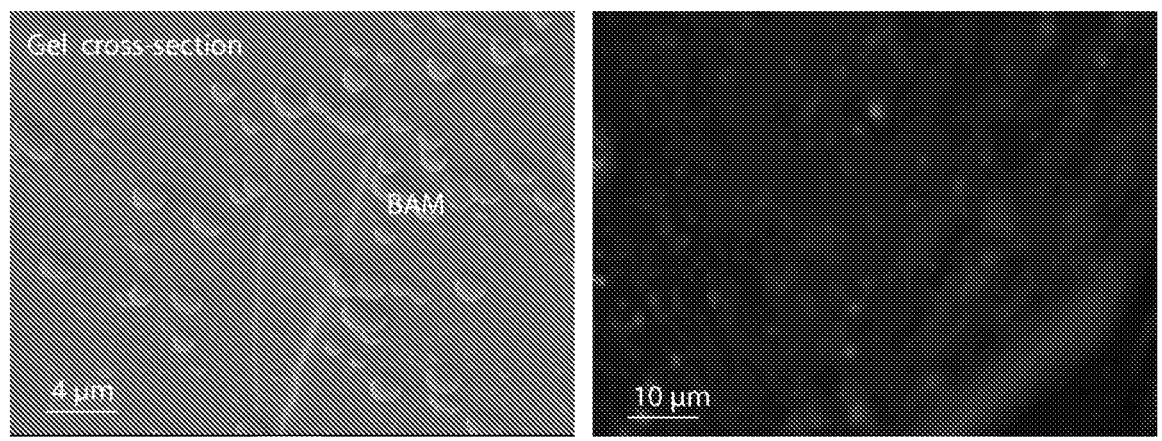
FIGS. 22A and 22B are, respectively, SEM and confocal images of an example structure including a PEG hydrogel scaffold embedding an example of the apoptosis mimicking microspheres (some of which are labeled BAM in FIG. 22A) therein.

The resulting gel structure was sliced and a SEM image and a confocal image were taken of the cross-section. The SEM image is shown in FIG. 22A and the confocal image is shown in FIG. 22B. Both images show that the apoptosis mimicking microspheres were uniformly distributed within the PEG hydrogel matrix. The apoptosis mimicking microspheres are red labeled in FIG. 22B.

Example 6

In this example, apoptosis mimicking microspheres were formed as described in Example 1 (i.e., the biotin modified HEMA-PLLA polymer microspheres conjugated to the biotin modified phosphatidylserine.

The apoptosis mimicking microspheres were incorporated into a nanofibrous spongy microsphere (which acts as a scaffold that immobilizes the apoptosis mimicking microspheres). The nanofibrous spongy microspheres were fabricated from star shaped poly(L-lactic acid)-block-poly(L-lysine) (SS-PLLA-b-PLYS) through a reverse emulsification process (during which the polymer solution was quickly poured into vigorously stirred glycerol).

The apoptosis mimicking microspheres and the nanofibrous spongy microspheres were mixed together at a ratio of 1:10 (although other ratios could be used). This powder mixture was then subject to a mixed solvent atmosphere of hexane:tetrahydrofuran (9:1 in volume) for about 20 minutes followed by vacuum-drying for 3 days to remove the solvents.

Figure 23A:
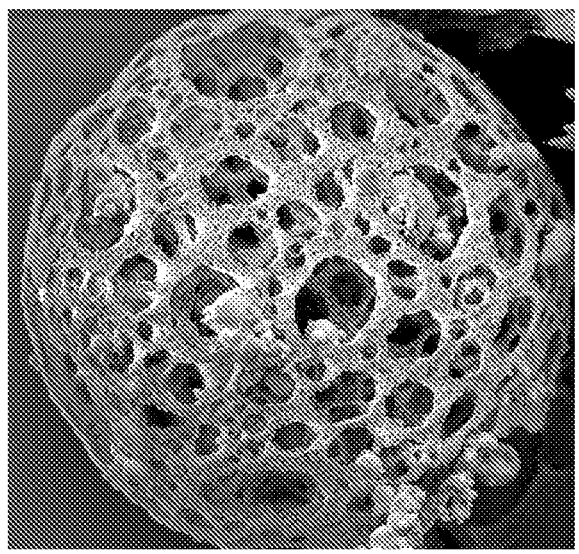
FIGS. 23A and 23B are, respectively, SEM and confocal images of an example structure including a nanofibrous spongy microsphere scaffold having immobilized thereon an example of the apoptosis mimicking microspheres (where arrows are pointing to some of the apoptosis mimicking microspheres in FIG. 23B).
Figure 23B:
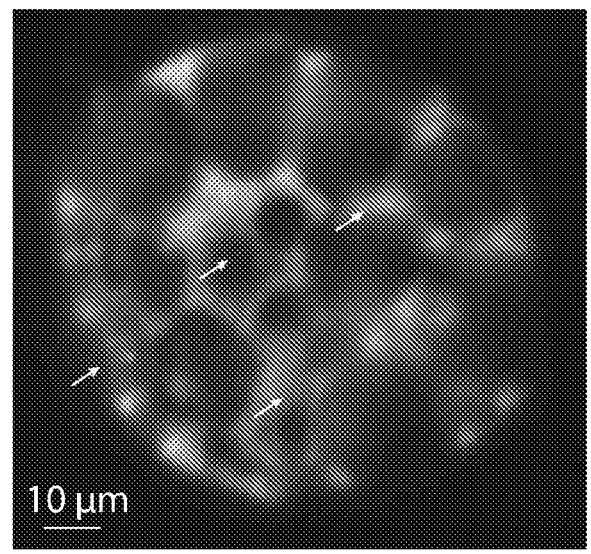

A SEM image and a confocal image of the resulting structure were taken. The SEM image is shown in FIG. 23A and the confocal image is shown in FIG. 23B. Both images show that the apoptosis mimicking microspheres were uniformly distributed among the nanofibrous spongy microsphere. The apoptosis mimicking microspheres are red labeled in FIG. 23B.

In the examples disclosed herein, the biomimetic apoptosis mimicking structures have increased their potential of being phagocytosed by macrophages, increased CCL-2 secretion by macrophages, and ultimately stem and progenitor cell recruitment and migration. More specifically, the engulfment of the apoptosis mimicking structures by macrophages can induce CCL-2 and other biomolecule secretion, and can recruit an influx of stem and progenitor cells from the surrounding native bone, marrow and/or periosteum. As such, the biomimetic apoptosis mimicking structures are able to enhance and maximize the osteogenic effects of polymer scaffolds. It is believed that the apoptosis mimicking structures disclosed herein have the potential to be an immunomodulatory biomaterial to regenerate and repair bone and other tissue and organs.

It is to be understood that the ranges provided herein include the stated range and any value or sub-range within the stated range, as if such value(s) or sub-range(s) were explicitly recited. For example, a range from about 0.1 µm to about 100 µm should be interpreted to include not only the explicitly recited limits of from about 0.1 µm to about 100 µm, but also to include individual values, such as 0.9 µm, 8 µm, 60 µm, etc., and sub-ranges, such as from about 1 µm to about 90 µm, from about 25 µm to about 75 µm, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An apoptosis-mimicking structure, consisting of:
   a polymeric core consisting of a polymer backbone and a surface functional group attached to the polymer backbone, the polymer backbone being a synthetic polymer selected from the group consisting of poly (l-lactide), poly (lactide-co-glycolide), polyglycolide, and polycaprolactone;
   a first linking group bonded to the surface functional group;
   a binding protein bonded to the first linking group;
   a second linking group bonded to the binding protein; and
   an eat me signaling molecule bonded to the second linking group such that the eat me signaling molecule forms a terminal end group of the apoptosis-mimicking structure, wherein the eat me signaling molecule is phosphatidylserine.

2. The apoptosis-mimicking structure as defined in claim 1 wherein the apoptosis-mimicking structure is a solid or porous sphere.

3. The apoptosis-mimicking structure as defined in claim 1 wherein:
   the surface functional group is an alkene;
   the first linking group is biotin that is bonded to the alkene through cysteine;
   the second linking group is biotin that is bonded to the eat me signaling molecule through an amine-modified poly (ethylene glycol); and
   the binding protein is avidin.

4. The apoptosis-mimicking structure as defined in claim 1, further comprising a mineral, a biomolecule, or combinations thereof at least partially encapsulated within the polymeric core.

5. The apoptosis-mimicking structure as defined in claim 4 wherein:
   the mineral is a calcium-containing compound; or
   the biomolecule is selected from the group consisting of chemokine ligand 2, chemokine ligand 7, interleukin 4, interleukin 13, transforming growth factor-beta (TGF-b), fibroblast growth factor (FGF), VEGF, platelet derived growth factor (PDGF), parathyroid hormone (PTH), chemoattractant, bone morphogenetic protein (BMP), derivatives thereof, and combinations thereof.

6. The apoptosis-mimicking structure as defined in claim 1 wherein a diameter of the structure ranges from 1 µm to about 100 µm.

7. The apoptosis-mimicking structure as defined in claim 1 wherein the surface functional group is selected from the group consisting of a hydroxyl, an amine, a thiol, a carboxylic acid, an alkene, an alkyne, an alkyl halide, an aldehyde, a ketone, an ester, an amide, and a phenyl.

8. The apoptosis-mimicking structure as defined in claim 1 wherein the surface functional group is selected from the group consisting of an alkene, an alkyne, an alkyl halide, an aldehyde, a ketone, an ester, an amide, and a phenyl.

9. The apoptosis-mimicking structure as defined in claim 1 wherein a diameter of the structure ranges from about 2 µm to about 100 µm.

10. An apoptosis-mimicking structure, consisting of:
    a polymeric core consisting of a polymer backbone and a surface functional group attached to the polymer backbone, the polymer backbone being a synthetic polymer selected from the group consisting of poly (l-lactide), poly (lactide-co-glycolide), polyglycolide, and polycaprolactone; and
    an eat me signaling molecule modified with a functional group that covalently bonds to the surface functional group, wherein the eat me signaling molecule is phosphatidylserine, and wherein the eat me signaling molecule functional group is selected from the group consisting of a hydroxyl, an amine, a thiol, a carboxylic acid, an alkene, an alkyne, an alkyl halide, an aldehyde, a ketone, an ester, an amide, and a phenyl.

11. The apoptosis-mimicking structure as defined in claim 10 wherein:
    the surface functional group is the alkene; and
    the eat me signaling molecule functional group is the thiol.

12. A structure, comprising:
    a scaffold; and
    the apoptosis-mimicking structure of claim 1 immobilized on or incorporated into the scaffold.

13. The structure as defined in claim 12 wherein the scaffold is selected from the group consisting of a polymer scaffold with a porous structure, a polymer scaffold including nanofibrous walls and interconnected pores, an injectable hydrogel scaffold, an implantable hydrogel scaffold, and an injectable cell microcarrier.

14. A tissue regeneration method, comprising introducing the structure of claim 12 into a defect in a bone, smooth muscle, blood vessel, heart valve, cardiac muscle, skeletal muscle, bladder, tendon, ligament, skin, fat, or cartilage.

15. A method for making the apoptosis-mimicking structure of claim 1, the method comprising:

generating the polymeric core consisting of the polymer backbone and the surface functional group attached to the polymer backbone;
binding the first linking group to the surface functional group;
binding the binding protein bonded to the first linking group; and
bonding the eat me signaling molecule to the binding protein via the second linking group such that the eat me signaling molecule forms the terminal end group of the apoptosis-mimicking structure.

16. The method as defined in claim 15 wherein binding the first linking group to the surface functional group forms a biotin-modified polymeric core and involves:
bonding cysteine to the surface functional group; and
bonding biotin to the cysteine group.

17. The method as defined in claim 16, wherein the second linking group is biotin, and wherein the method further comprises forming a biotin-modified eat me signaling molecule by:
bonding an amine-modified poly (ethylene glycol) to the eat me signaling molecule; and
binding biotin to the amine-modified poly (ethylene glycol).

18. The method as defined in claim 16 wherein:
avidin is the binding protein; and
the bonding of the eat me signaling molecule to the binding protein includes:
dispersing the biotin-modified polymeric core in water to form a dispersion;
adding the avidin to the dispersion; and
adding the biotin-modified eat me signaling molecule to the dispersion.

19. The method as defined in claim 18 wherein from about 0.01 mg to about 100 mg of avidin is added for every 10 µg of biotin of the biotin-modified eat me signaling molecule.

20. The method as defined in claim 15 wherein prior to generating the polymeric core, the method further comprises attaching the surface functional group to the polymer backbone.

21. The method as defined in claim 20 wherein:
the attaching of the surface functional group to the polymer backbone involves a ring opening polymerization of monomers or dimers using an initiator with the surface functional group and a catalyst; and
the generating of the polymeric core involves an emulsion or a double emulsion technique.

22. The method as defined in claim 15, further comprising loading a mineral, a biomolecule, or combinations thereof into the polymeric core during the generation of the polymeric core.

23. A method for making the apoptosis-mimicking structure of claim 10, the method comprising:
generating a polymeric core consisting of the polymer backbone and the surface functional group attached to the polymer backbone; and
covalently bonding the functional group of the modified eat me signaling molecule to the surface functional group.

24. The method as defined in claim 23, wherein:
an eat me signaling molecule is used to form the modified eat me signaling molecule;
the eat me signaling molecule is phosphatidylserine;
the functional group is thiol; and
prior to covalently bonding the functional group, the method further comprises forming the modified eat me signaling molecule by:
reacting amine-modified polyethylene glycol with the phosphatidylserine to link the amine-modified polyethylene glycol to a carboxylic acid of the phosphatidylserine and form an intermediate; and
reacting the intermediate with 3-mercaptopropionic acid to introduce the thiol to the eat me signaling molecule.

25. The method as defined in claim 24, wherein the surface functional group is an alkene group.

* * * * *